United States Patent
Lee et al.

(10) Patent No.: US 11,463,233 B2
(45) Date of Patent: Oct. 4, 2022

(54) UNIT INTERVAL JITTER IMPROVEMENT IN A C-PHY INTERFACE

(71) Applicant: QUALCOMM Incorporated, San Diego, CA (US)

(72) Inventors: Chulkyu Lee, San Diego, CA (US); George Alan Wiley, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/307,770

(22) Filed: May 4, 2021

(65) Prior Publication Data
US 2021/0367749 A1 Nov. 25, 2021

Related U.S. Application Data

(60) Provisional application No. 63/028,326, filed on May 21, 2020.

(51) Int. Cl.
| | | |
|---|---|---|
| *H04B 14/04* | (2006.01) | |
| *H04L 7/00* | (2006.01) | |
| *G06F 13/42* | (2006.01) | |
| *H04L 12/40* | (2006.01) | |

(52) U.S. Cl.
CPC ........ *H04L 7/0041* (2013.01); *G06F 13/4282* (2013.01); *H04L 12/40* (2013.01)

(58) Field of Classification Search
CPC ... H04L 7/0041; H04L 12/40; G06F 13/4282; G06F 13/4063; H03K 5/133
USPC ................ 375/353, 342, 354, 371, 295, 259
See application file for complete search history.

(56) References Cited

U.S. PATENT DOCUMENTS

| | | | |
|---|---|---|---|
| 2005/0068082 A1* | 3/2005 | Nguyen ................ | H03K 5/133 712/E9.063 |
| 2015/0043693 A1* | 2/2015 | Lee ...................... | G06F 13/4063 375/354 |
| 2015/0381340 A1 | 12/2015 | Pandey et al. | |

FOREIGN PATENT DOCUMENTS

| | | |
|---|---|---|
| WO | 2016007218 A1 | 1/2016 |
| WO | 2017019223 A1 | 2/2017 |

OTHER PUBLICATIONS

International Search Report and Written Opinion—PCT/US2021/030933—ISA/EPO—dated Sep. 2, 2021.

* cited by examiner

*Primary Examiner* — Phuong Phu
(74) *Attorney, Agent, or Firm* — Loza & Loza, LLP

(57) ABSTRACT

Methods, apparatus, and systems for communication over a C-PHY interface are disclosed. A transmitting device has a driver circuit configured to drive a three-wire bus in accordance with a symbol received at an input of the driver circuit, a pattern detector receives a sequence of symbols to be transmitted over the three-wire bus in a plurality of transmission symbol intervals, and a selection circuit responsive to a select signal provided by the pattern detector and configured to select between delayed and undelayed versions of a current symbol to drive the input of the driver circuit during a corresponding transmission symbol interval. The select signal may select the delayed version of the current symbol when a combination of the current symbol with an immediately preceding symbol cause the pattern detector to indicate a pattern match.

30 Claims, 17 Drawing Sheets

UNIT INTERVAL JITTER IMPROVEMENT IN A C-PHY INTERFACE

PRIORITY CLAIM

This application claims priority to and the benefit of U.S. Provisional Patent Application Ser. No. 63/028,326 filed in the U.S. Patent Office on May 21, 2020, the entire content of this application being incorporated herein by reference as if fully set forth below in its entirety and for all applicable purposes.

TECHNICAL FIELD

The present disclosure relates generally to high-speed data communication interfaces, and more particularly, to improving clock recovery in a receiver through signaling generated at the transmitter.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

The C-PHY interface is a multiphase three-wire interface defined by the MIPI Alliance that uses a trio of conductors to transmit information between devices. Each wire in the trio may be in one of three signaling states during transmission of a symbol. Clock information is encoded in the sequence of transmitted symbols and a receiver generates a clock signal from transitions between consecutive symbols. The ability of a clock and data recovery (CDR) circuit to recover clock information may be limited by the maximum time variation related to transitions of signals transmitted on the different wires of the communication link. The CDR circuit in a C-PHY receiver may employ a mask that is intended to block all but the first transition detection between consecutively transmitted symbols. Variations in the timing of the first transition can limit the maximum data throughput through the C-PHY interface by causing jitter in the received clock and by necessitating the use of a mask that significantly reduces the sampling window used to capture symbols at the receiver. For these and other reasons, there is an ongoing need for optimized clock generation circuits that can function reliably at ever-higher signaling frequencies.

SUMMARY

Embodiments disclosed herein provide systems, methods and apparatus that enable improved communication on a multi-wire and/or multiphase communication link. The communication link may be deployed in apparatus such as a mobile terminal having multiple Integrated Circuit (IC) devices. Certain techniques disclosed herein can reduce the jitter in a recovered receive clock by detecting certain patterns of symbols that can reduce the detected symbol duration for one or more symbols.

In various aspects of the disclosure, a transmitter has a driver circuit configured to drive a three-wire bus in accordance with a symbol received at an input of the driver circuit, a pattern detector configured to receive a sequence of symbols to be transmitted over the three-wire bus in a plurality of transmission symbol intervals, and a selection circuit responsive to a select signal provided by the pattern detector and configured to select between delayed and undelayed versions of a current symbol taken from the sequence of symbols to drive the input of the driver circuit during a corresponding transmission symbol interval. The select signal may select the delayed version of the current symbol when the pattern detector determines that a transition between the undelayed version of the current symbol and an immediately preceding symbol in the sequence of symbols is expected to cause an early detection of the transition at a receiver. The select signal may select the delayed version of the current symbol when the combination of the current symbol with the immediately preceding symbol cause the pattern detector to indicate a pattern match.

In various aspects of the disclosure, method for transmitting information over a three-wire bus includes receiving a sequence of symbols to be transmitted over the three-wire bus in a plurality of transmission symbol intervals and, when initiating transmission of a current symbol in the sequence of symbols during a corresponding transmission symbol interval, transmitting the current symbol without delay during the corresponding transmission symbol interval when a combination of the current symbol with an immediately preceding symbol cause the pattern detector to indicate no pattern match, and/or delaying transmission of the current symbol within the corresponding transmission symbol interval when the combination of the current symbol with the immediately preceding symbol cause the pattern detector to indicate a pattern match.

In various aspects of the disclosure, a processor-readable storage medium has one or more instructions which, when executed by at least one processor of a processing circuit in a receiver, cause the at least one processor to receive a sequence of symbols to be transmitted over a three-wire bus in a plurality of transmission symbol intervals and, when initiating transmission of a current symbol in the sequence of symbols during a corresponding transmission symbol interval, transmit the current symbol without delay during the corresponding transmission symbol interval when a combination of the current symbol with an immediately preceding symbol cause the pattern detector to indicate no pattern match, and delay transmission of the current symbol within the corresponding transmission symbol interval when the combination of the current symbol with the immediately preceding symbol cause the pattern detector to indicate a pattern match.

In various aspects of the disclosure, a transmitting apparatus includes means for receiving a sequence of symbols to be transmitted over the three-wire bus in a plurality of transmission symbol intervals, and means for transmitting symbols over the three-wire bus. The means for transmitting symbols may be configured to transmit a current symbol in the sequence of symbols during a corresponding transmission symbol by transmitting the current symbol without delay during the corresponding transmission symbol interval when a combination of the current symbol with an immediately preceding symbol cause the pattern detector to indicate no pattern match, and/or delaying transmission of the current symbol within the corresponding transmission symbol interval when the combination of the current symbol with the immediately preceding symbol cause the pattern detector to indicate a pattern match.

In one aspect, early detection of a transition at a receiver is expected to occur when signaling state of each wire of the three-wire bus defined by the current symbol is different from signaling state of a corresponding wire defined by the immediately preceding symbol. In another aspect, the sequence of symbols is transmitted over the three-wire bus in accordance with a C-PHY protocol.

In certain aspects, a duration of a received symbol interval in which the current symbol is received at a receiver is expected to be less than a duration of a transmission symbol interval in which the current symbol is transmitted when the immediately preceding symbol is followed in transmission by the undelayed version of the current symbol. The duration of the received symbol interval may increase when the delayed version of the current symbol is selected to drive the input of the driver circuit during the corresponding transmission symbol interval. Jitter in a clock signal recovered at the receiver may be reduced when the delayed version of the current symbol is selected to drive the input of the driver circuit during the corresponding transmission symbol interval.

In some aspects, a delay circuit is configured to generate delayed versions of three signals representative of the current symbol by delaying the three signals by a delay duration calculated to reduce a difference between a duration of a received symbol interval at a receiver and a duration of a transmission symbol interval corresponding to the current symbol. The delay duration may be further configured to reduce a signal transition region in the receiver. A controller may be configured to modify the delay duration to accommodate changes in variations in manufacturing process, circuit supply voltage, and die temperature conditions.

DETAILED DESCRIPTION

Figure 1:
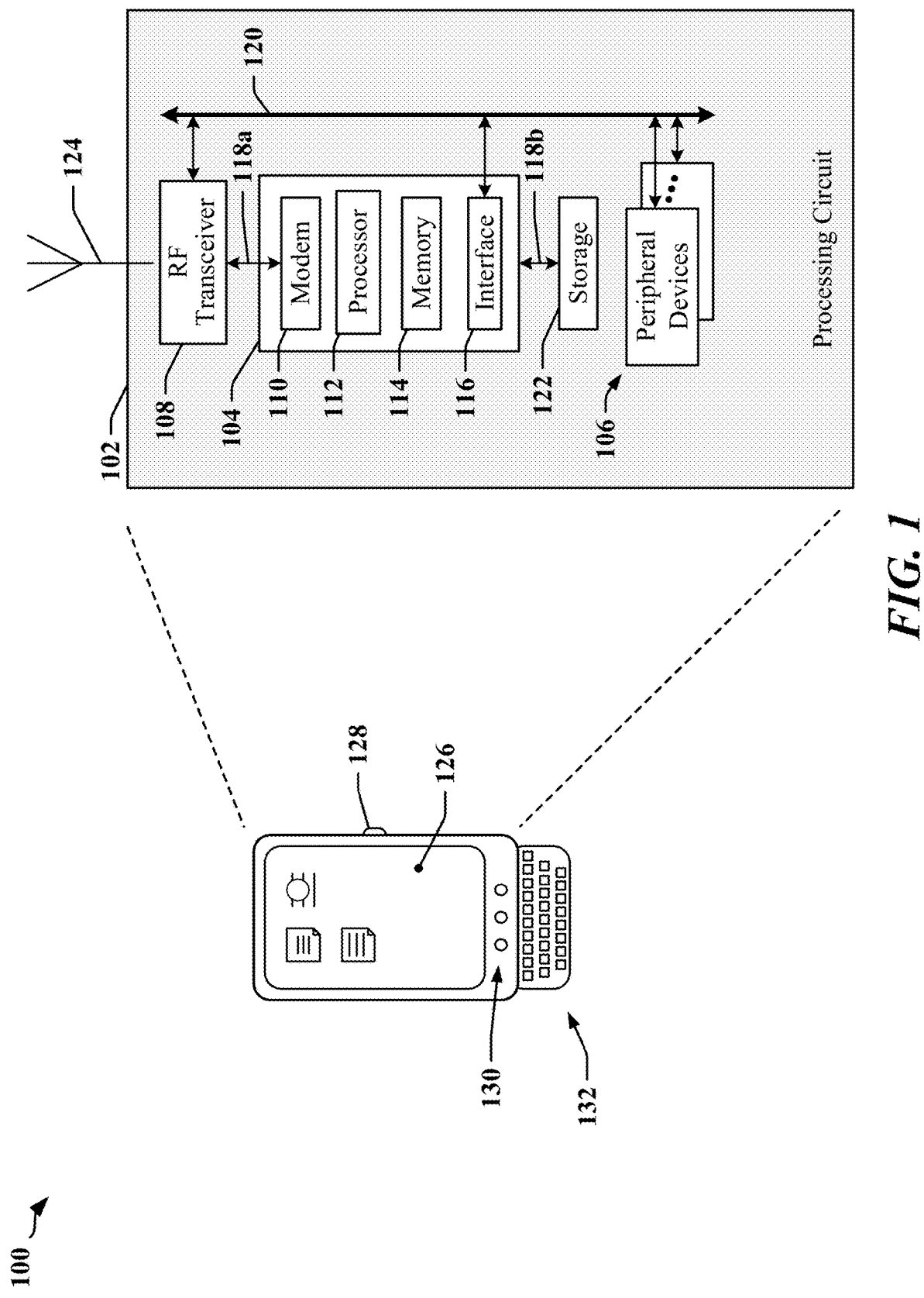
FIG. 1 depicts an apparatus employing a data link between IC devices that is selectively operated according to one of a plurality of available standards or protocols, which may include a C-PHY protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smartwatch, a health or fitness tracker, eyewear, etc.), an appliance, a sensor, a security device, a vending machine, a smart meter, a drone, a multicopter, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted over a set of three wires, which may be referred to as a trio, or trio of wires. For each symbol transmission interval, a three-phase signal is transmitted in different phases on the wires of the trio, where the phase of the three-phase signal on each wire is defined by a symbol transmitted in the symbol transmission interval. Each trio provides a lane on a communication link. A symbol transmission interval may be defined as the interval of time in which a single symbol controls the signaling state of a trio. In each symbol transmission interval, one wire of the trio is undriven, while the remaining two wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +½V. Different symbols are transmitted in each consecutively transmitted pair of symbols, and different pairs of wires may be differentially driven in different symbol intervals.

Certain aspects disclosed herein provide a method for transmitting information over a three-wire bus. Patterns of symbols that can cause reduced UI duration at the receiver are detected, and transmission of one or more symbols may be delayed such that the reduced UI duration may be avoided or minimized. The method may include receiving a sequence of symbols at the transmitting device, where the sequence of symbols is to be transmitted over the three-wire bus in a plurality of transmission symbol intervals. The transmission symbol intervals may correspond to periods of a transmission clock. The transmitter may receive a current symbol in the sequence of symbols for transmission during a transmission symbol interval to be used for transmitting the current symbol. The transmitting device may provide each symbol, in sequence to a pipeline, thereby obtaining copies of at least two symbols, including a first symbol that is being transmitted and a second symbol that will be transmitted next. At a transition between symbol intervals, the second symbol becomes the current symbol, and the first symbol becomes the immediately preceding symbol. When transmitting the current symbol in the sequence of symbols during a corresponding transmission symbol interval, the transmitting device may determine whether transmission of the current symbol will cause an early detection at the receiving device of the transition between the first and second symbol. The transmitting device may make such determination through the use of a pattern detector. In one example, the transmitting device may transmit the current symbol without delay during the corresponding transmission symbol interval, when a combination of the current symbol with an immediately preceding symbol cause the pattern detector to indicate no pattern match. In another example, the transmitting device may delay transmission of the current symbol within the corresponding transmission symbol interval when the combination of the current symbol with the immediately preceding symbol cause the pattern detector to indicate a pattern match.

Example of an Apparatus Employing a C-PHY Interface

FIG. 1 depicts an example of apparatus 100 that may be adapted in accordance with certain aspects disclosed herein. The apparatus 100 may employ C-PHY 3-phase protocols to implement one or more communication links. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processor 112 provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or processor-readable storage 122 provided on the processing circuit 102. The software modules may include instructions and data stored in the on-board memory 114 or other processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols.

The processing circuit 102 may include or control a power management function that configures and manages the operation of the apparatus 100.

Figure 2:
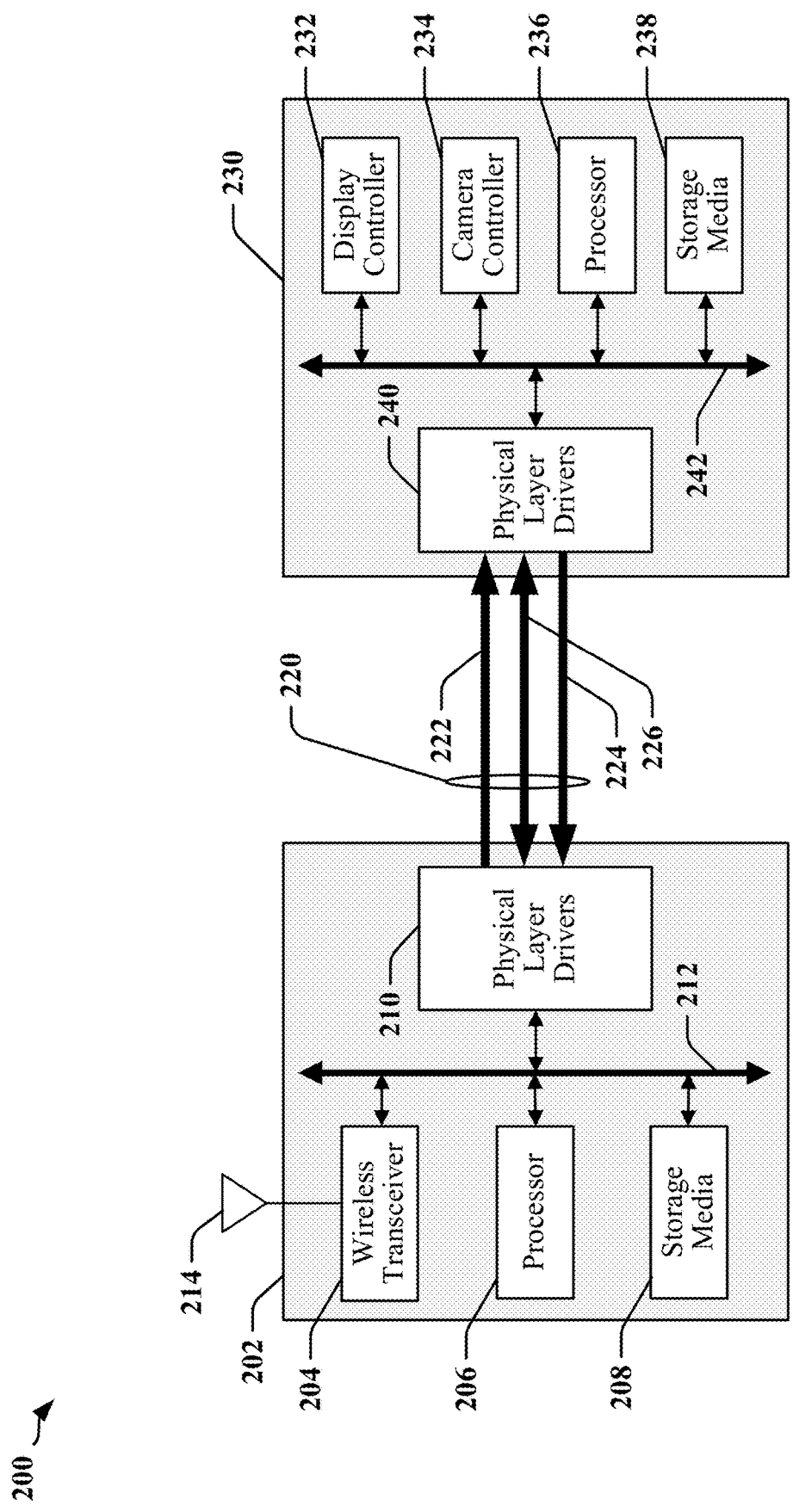
FIG. 2 illustrates a system architecture for an apparatus employing a data link between IC devices that selectively operates according to one of plurality of available standards.

FIG. 2 illustrates certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor 206, 236, controller or other processing and/or computing circuit or device. In one example, the first IC device 202 may perform core functions of the apparatus 200, including establishing and maintaining wireless communication through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal buses 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate, symbol transmission rate and/or clocking rates. The forward and reverse data rates may be substantially the same or may differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
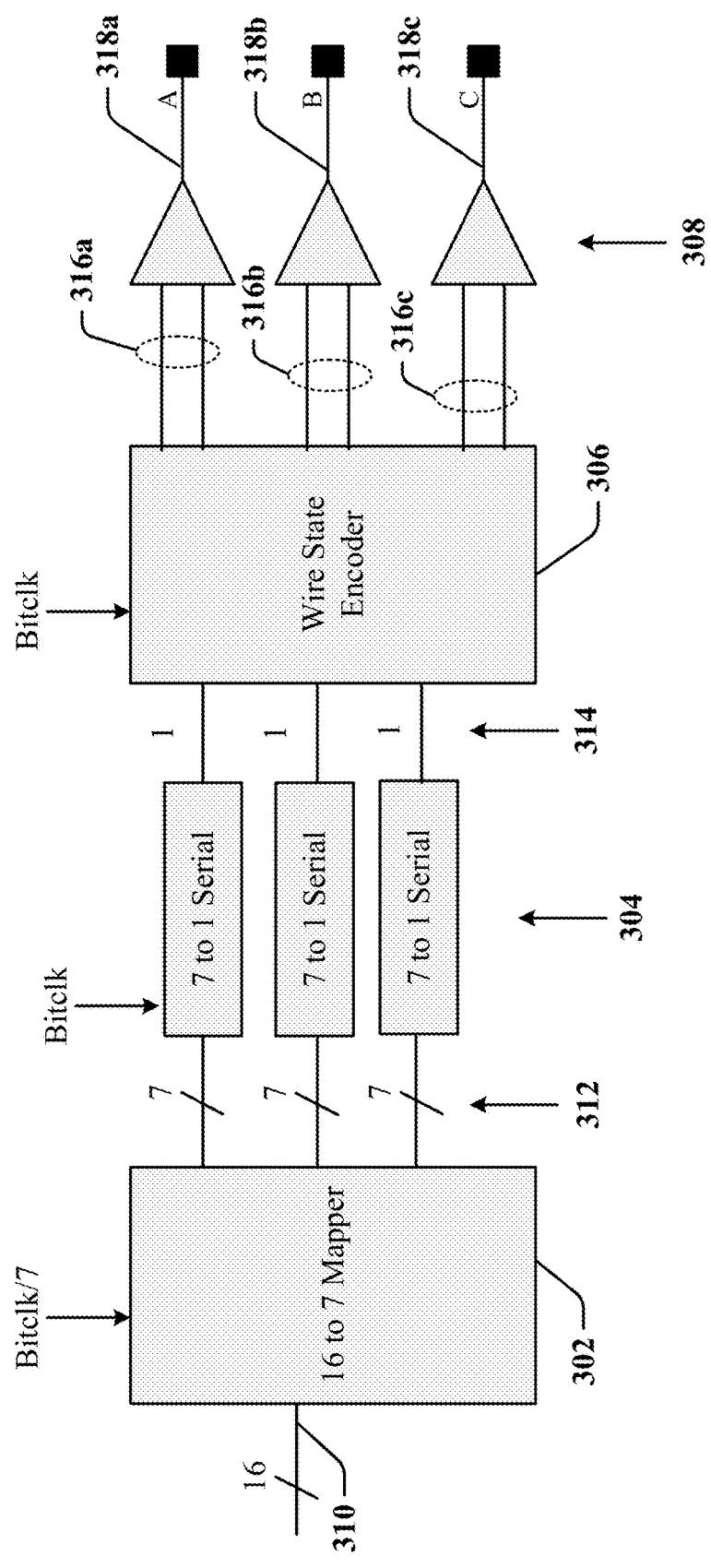
FIG. 3 illustrates a C-PHY 3-phase transmitter.

FIG. 3 is a diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 318a, 318b and/or 318c, and/or by driving a current through two of the signal wires 318a, 318b and/or 318c connected in series such that the current flows in different directions in the two signal wires 318a, 318b and/or 318c. The undriven state may be realized by placing an output of a driver of a signal wire 318a, 318b or 318c in a high-impedance mode. Alternatively, or additionally, an undriven state may be obtained on a signal wire 318a, 318b or 318c by passively or actively causing an "undriven" signal wire 318a, 318b or 318c to attain a voltage level that lies substantially halfway between positive and negative voltage levels provided on driven signal wires 318a, 318b and/or 318c. Typically, there is no significant current flow through an undriven signal wire 318a, 318b or 318c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 318a, 318b and 318c. The line drivers 308 may be implemented as unit-level current-mode or voltage-mode drivers. In some implementations, each line driver 308 may receive sets of signals 316a, 316b and 316c that determine the output state of corresponding signal wires 318a, 318b and 318c. In one example, each of the sets of signals 316a, 316b and 316c may include two or more signals, including a pull-up signal (PU signal) and a pull-down signal (PD signal) that, when high, activate pull-up and pull down circuits that drive the signal wires 318a, 318b and 318c toward a higher level or lower level voltage, respectively. In this example, when both the PU signal and the PD signal are low, the signal wires 318a, 318b and 318c may be terminated to a mid-level voltage.

For each transmitted symbol interval in an M-wire, N-phase polarity encoding scheme, at least one signal wire 318a, 318b or 318c is in the midlevel/undriven (0) voltage or current state, while the number of positively driven (+1 voltage or current state) signal wires 318a, 318b or 318c is equal to the number of negatively driven (−1 voltage or current state) signal wires 318a, 318b or 318c, such that the sum of current flowing to the receiver is always zero. For each symbol, the signaling state of at least one signal wire 318a, 318b or 318c is changed from the wire state transmitted in the preceding transmission interval.

In operation, a mapper 302 may receive and map 16-bit data 310 to 7 symbols 312. In the 3-wire example, each of the 7 symbols defines the states of the signal wires 318a, 318b and 318c for one symbol interval. The 7 symbols 312 may be serialized using parallel-to-serial converters 304 that provide a timed sequence of symbols 314 for each signal wire 318a, 318b and 318c. The sequence of symbols 314 is typically timed using a transmission clock. A 3-wire, 3-phase encoder 306 receives the sequence of 7 symbols 314 produced by the mapper one symbol at a time and computes the state of each signal wire 318a, 318b and 318c for each symbol interval. The 3-wire, 3-phase encoder 306 selects the states of the signal wires 318a, 318b and 318c based on the current input symbol 314 and the previous states of signal wires 318a, 318b and 318c.

The use of M-wire, N-phase encoding permits a number of bits to be encoded in a plurality of symbols where the bits per symbol is not an integer. In the example of a 3-wire communication link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, log 2(5)=2.32 bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
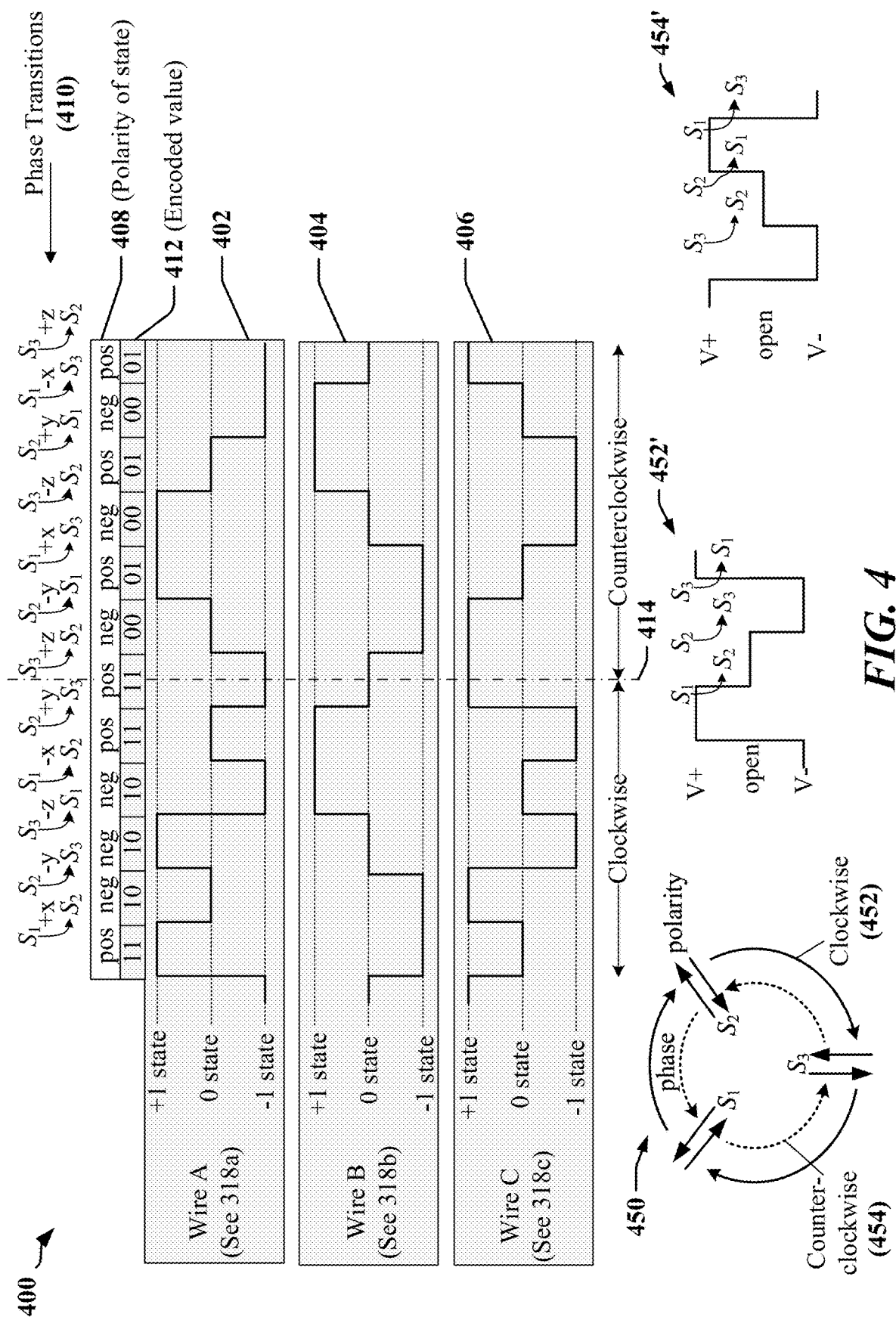
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 318a, 318b and 318c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 318a, 318b and 318c is in a different signaling states than the other wires. When more than 3 signal wires 318a, 318b and 318c are used in a 3-phase encoding system, two or more signal wires 318a, 318b and/or 318c can be in the same signaling state at each signaling interval, although each state is present on at least one signal wire 318a, 318b and/or 318c in every signaling interval.

Information may be encoded in the direction of rotation at each phase transition 410, and the 3-phase signal may change direction for each signaling state. Direction of rotation may be determined by considering which signal wires 318a, 318b and/or 318c are in the '0' state before and after a phase transition, because the undriven signal wire 318a, 318b and/or 318c changes at every signaling state in a rotating three-phase signal, regardless of the direction of rotation.

The encoding scheme may also encode information in the polarity 408 of the two signal wires 318a, 318b and/or 318c that are actively driven. At any time in a 3-wire implementation, exactly two of the signal wires 318a, 318b, 318c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 318a, 318b and 318c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

Figure 5:
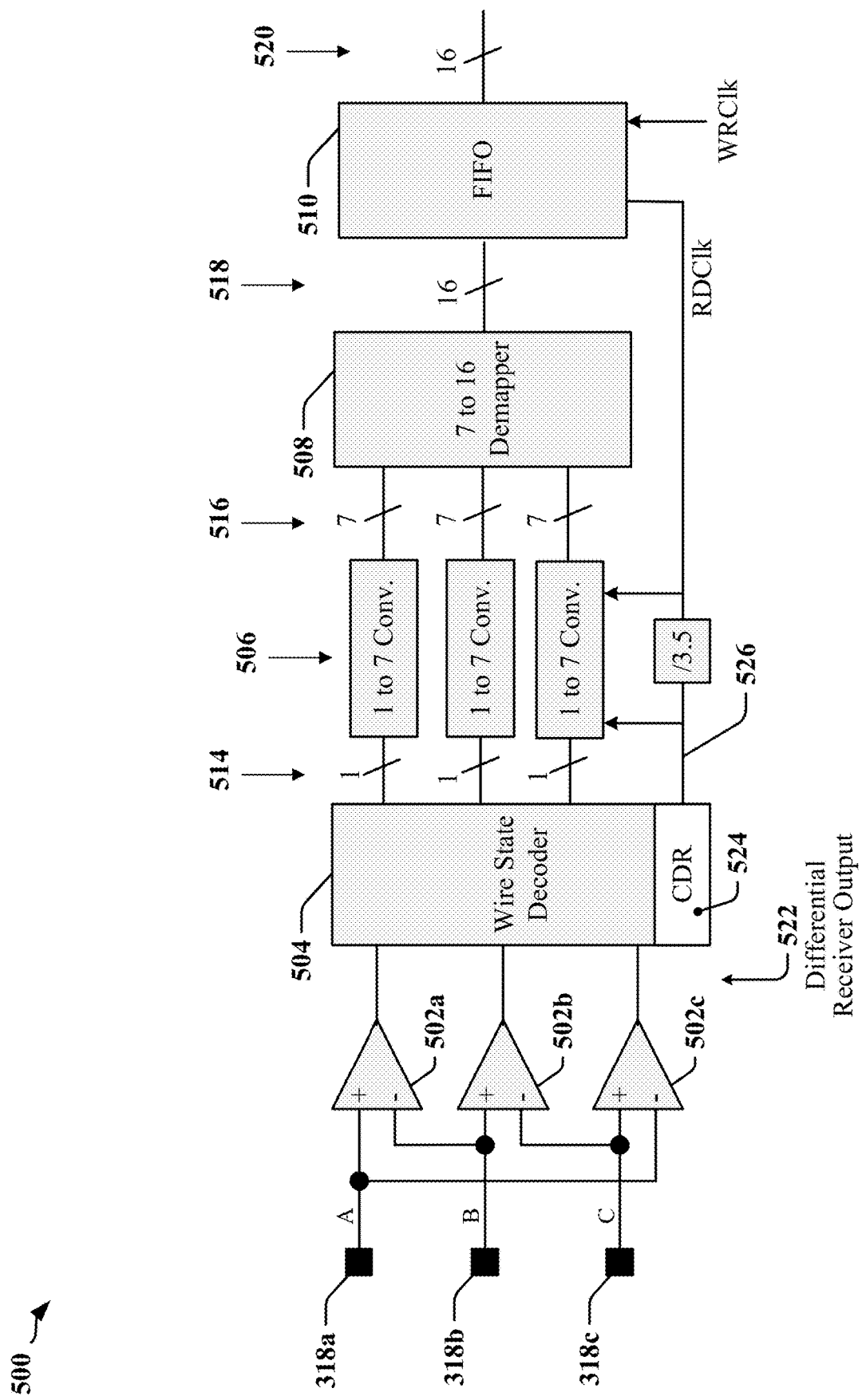
FIG. 5 illustrates a C-PHY 3-phase receiver.

FIG. 5 is a diagram illustrating certain aspects of a 3-wire, 3-phase decoder 500. Differential receivers 502a, 502b, 502c and a wire state decoder 504 are configured to provide a digital representation 522 of the state of the three transmission lines (e.g., the signal wires 318a, 318b and 318c illustrated in FIG. 3), with respect to one another, and to detect changes in the state of the three transmission lines compared to the state transmitted in the previous symbol period. Seven consecutive states are assembled by the serial-to-parallel convertors 506 to obtain a set of 7 symbols 516 to be processed by the demapper 508. The demapper 508 produces 16 bits of data 518 that may be buffered in a first-in-first-out (FIFO) register 510 to provide output data 520. The wire state decoder 504 may extract a sequence of symbols 514 from phase encoded signals received on the signal wires 318a, 318b and 318c. The symbols 514 are encoded as a combination of phase rotation and polarity as disclosed herein. The wire state decoder may include a CDR circuit 524 that extracts a clock 526 that can be used to reliably capture wire states from the signal wires 318a, 318b and 318c. A transition occurs on least one of the signal wires 318a, 318b and 318c at each symbol boundary and the CDR circuit 524 may be configured to generate the clock 526 based on the occurrence of a transition or multiple transitions. An edge of the clock may be delayed to allow time for all signal wires 318a, 318b and 318c to have stabilized and to thereby ensure that the current wire state is captured for decoding purposes.

Figure 6:
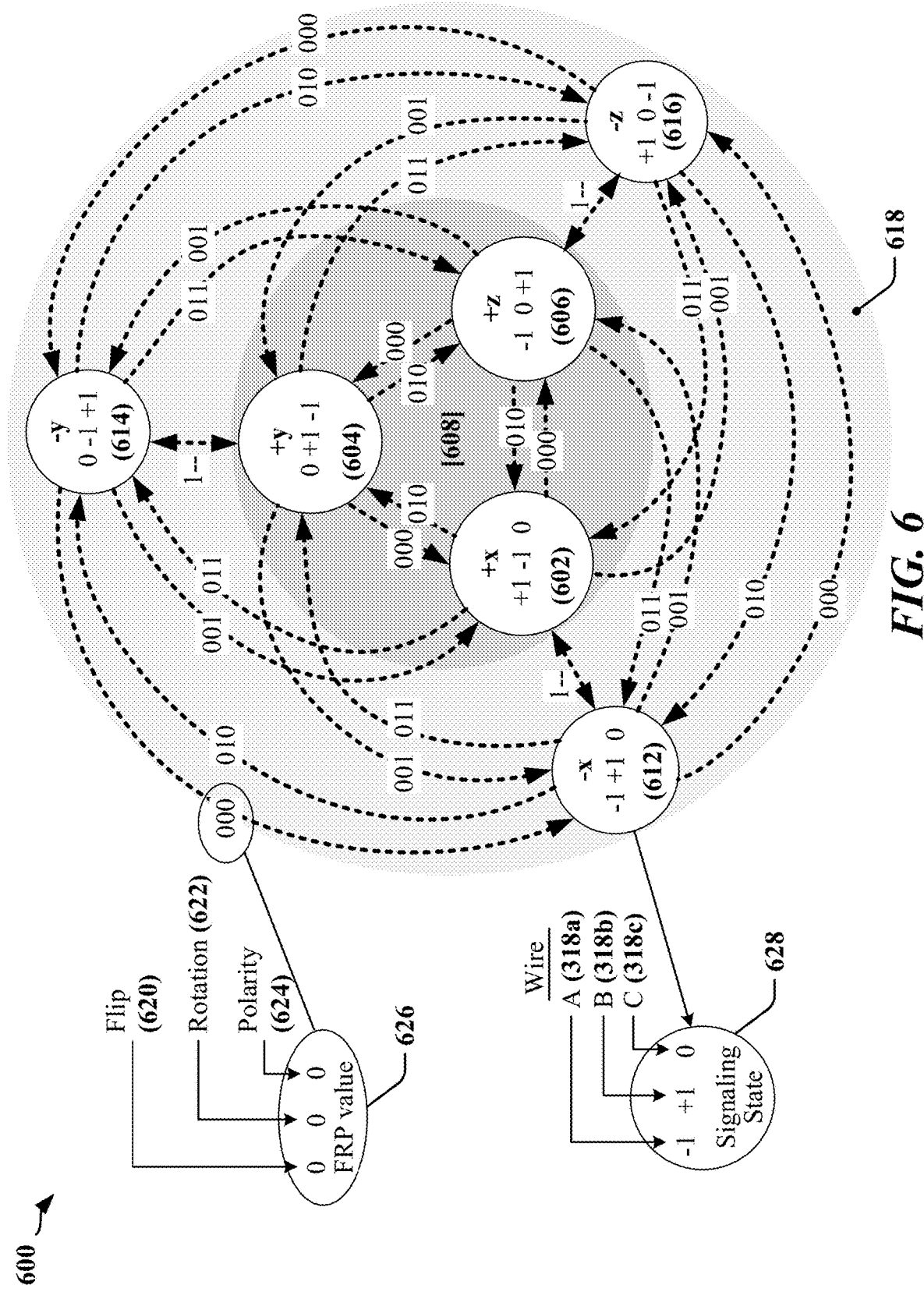
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible signaling states 602, 604, 606, 612, 614 and 616 in the state diagram 600 include and expand on the states shown in the circular state diagram 450 of FIG. 4. As shown in the exemplar of a state element 628, each signaling state 602, 604, 606, 612, 614 and 616 in the state diagram 600 defines voltage signaling state of the signal wires 318a, 318b, 318c, which are labeled A, B and C respectively. For example, in signaling state 602 (+x) wire A=+1, wire B=−1 and wire C=0, yielding output of differential receiver 502a (A-B)=+2, differential receiver 502b (B-C)=−1 and differential receiver 502c (C-A)=−1. Transition decisions taken by phase change detect circuits in a receiver are based on 5 possible levels produced by the differential receivers 502a, 502b, 502c, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity signaling states 602, 604, 606 and an outer circle 618 that encompasses the negative polarity signaling states 612, 614, 616.

Jitter in 3-Phase Interfaces

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
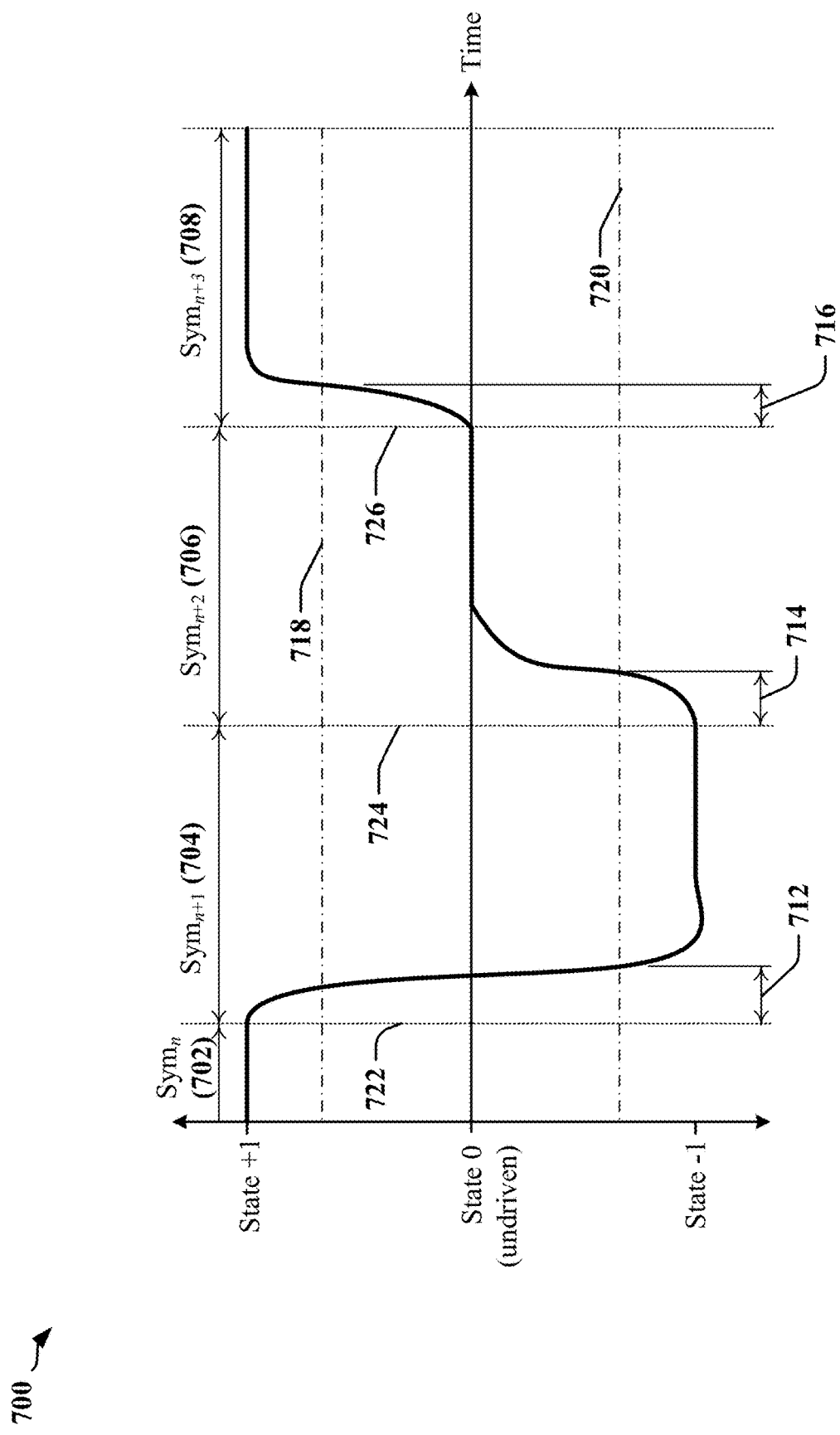
FIG. 7 is an example of the effects of signal rise times on transition detection in a C-PHY decoder.

FIG. 7 is a timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 318a, 318b or 318c. A first symbol $Sym_n$ 702 is transmitted in a first symbol interval that ends at a time 722 when a second symbol $Sym_{n+1}$ 704 is transmitted in a second symbol interval. The second symbol interval may end at time 724 when a third symbol $Sym_{n+2}$ 706 is transmitted in the third symbol interval, which ends at time 726 when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 318a, 318b or 318c to reach a threshold voltage 718 and/or 720. The threshold voltages may be used to determine the state of the signal wire 318a, 318b or 318c. The transition from a state determined by the second symbol 704 to the state for the third symbol 706 may be detectable after a delay 714 attributable to the time taken for voltage in the signal wire 318a, 318b or 318c to reach one of the threshold voltages 718 and/or 720. The transition from a state determined by the third symbol 706 to the state for the fourth symbol 708 may be detectable after a delay 716 attributable to the time taken for voltage in the signal wire 318a, 318b or 318c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
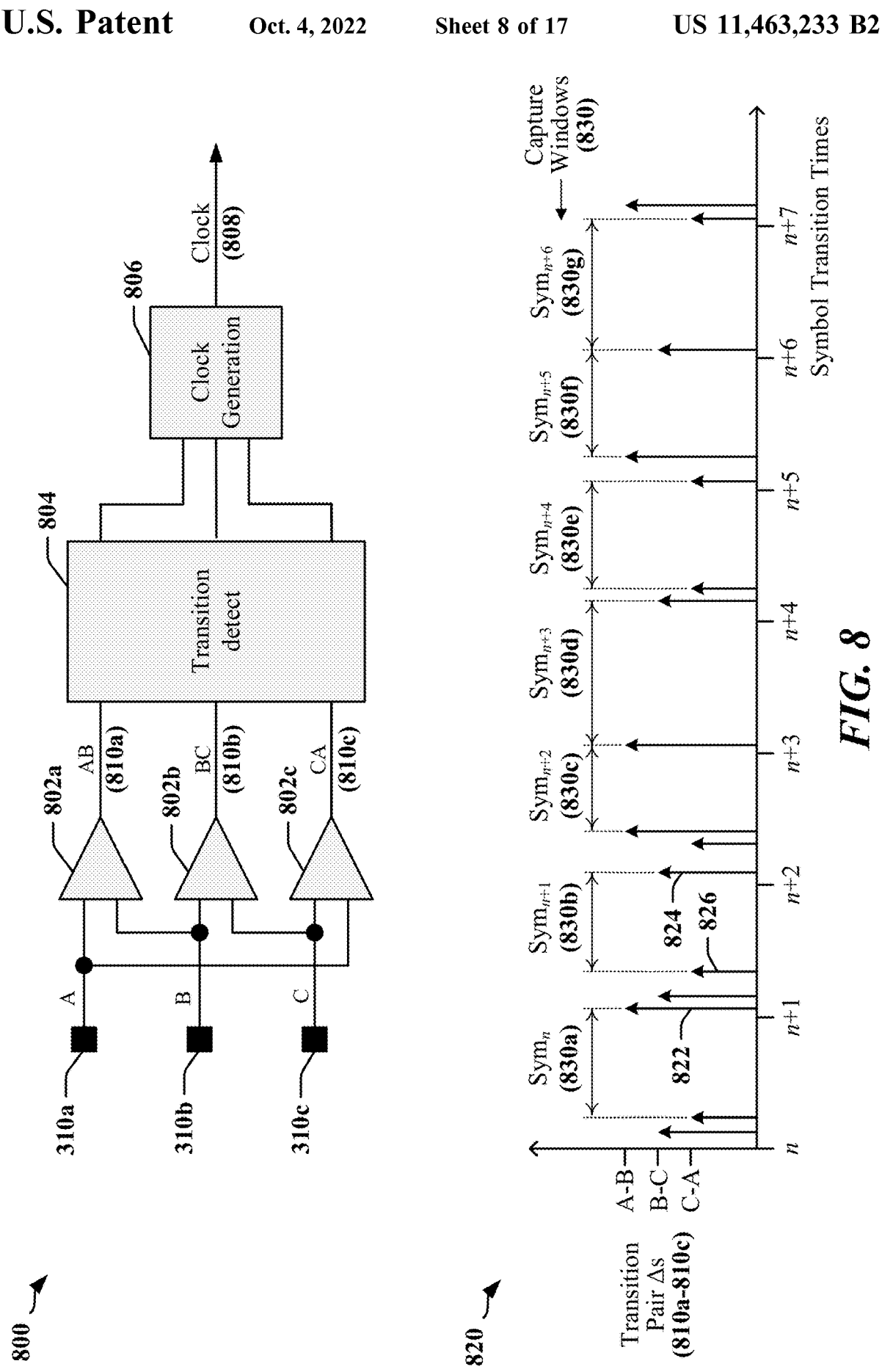
FIG. 8 illustrates transition detection in a C-PHY decoder.

FIG. 8 illustrates certain aspects of CDR circuits that may be provided in a receiver in a C-PHY interface 800. Differential receivers 802a, 802b and 802c are configured to generate a set of difference signals 810a, 810b, 810c by comparing signaling state of each different pair of signal wires 318a, 318b and 318c in a trio. In the illustrated example, a first differential receiver 802a provides an AB difference signal 810a representative of the difference in signaling state of A and B signal wires 318a and 318b, a second differential receiver 802b provides a BC difference signal 810b representative of the difference in signaling state of B and C signal wires 318b and 318c and a third differential receiver 802c provides a CA difference signal 810c representative of the difference in signaling state of C and A signal wires 318c and 318a. Accordingly, a transition detection circuit 804 can be configured to detect occurrence of a phase change because the output of at least one of the differential receivers 802a, 802b and 802c changes at the end of each symbol interval.

Transitions between some consecutively transmitted pairs of symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. Accordingly, a clock generation circuit 806 may include a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires in a trio may be detected at different times, which can result in the difference signals 810a, 810b, 810c assuming stable states at different times. The state of the difference signals 810a, 810b, 810c may switch before stability has been reached after the signaling state of each signal wire 318a, 318b and/or 318c has transitioned to its defined state for a symbol transmission interval. The result of such variability is illustrated in the timing diagram 820 of FIG. 8.

The timing of signaling state change detection may vary according to the type of signaling state change that has occurred. Markers 822, 824 and 826 represent occurrences of transitions in the difference signals 810a, 810b, 810c provided to the transition detection circuit 804. The markers 822, 824 and 826 are assigned different heights in the timing diagram 820 for clarity of illustration only, and the relative heights of the markers 822, 824 and 826 are not intended to show a specific relationship to voltage or current levels, polarity or weighting values used for clock generation or data decoding. The timing diagram 820 illustrates the effect of timing of transitions associated with symbols transmitted in phase and polarity on the three signal wires 318a, 318b and 318c. In the timing diagram 820, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

The throughput of a C-PHY communication link may be affected by duration and variability in signal transition times. A CDR may use a mask to prevent transitions between symbols that are reflected in two or more of the difference signals 810a, 810b, 810c from affecting recovery of the receive clock. In one example, the mask may be implemented to block multiple transitions in the difference signals 810a, 810b, 810c after the first transition in a difference signal 810a, 810b, 810c is detected. In another example, the mask may be implemented by generating a pulse from the first transition with a duration that exceeds the duration of the signal transition region between symbols. The duration in which the mask is in effect can limit channel bandwidth for a C-PHY interface. The duration in which the mask is in effect is typically calculated to accommodate variability in the operation of transition detection circuits. Variability in transition detection circuits can be caused by manufacturing process tolerances, variations and stability of voltage and current sources and operating temperature, as well as by the electrical characteristics of the signal wires 318a, 318b and 318c. The variability in detection circuits may further limit channel bandwidth.

Figure 9:
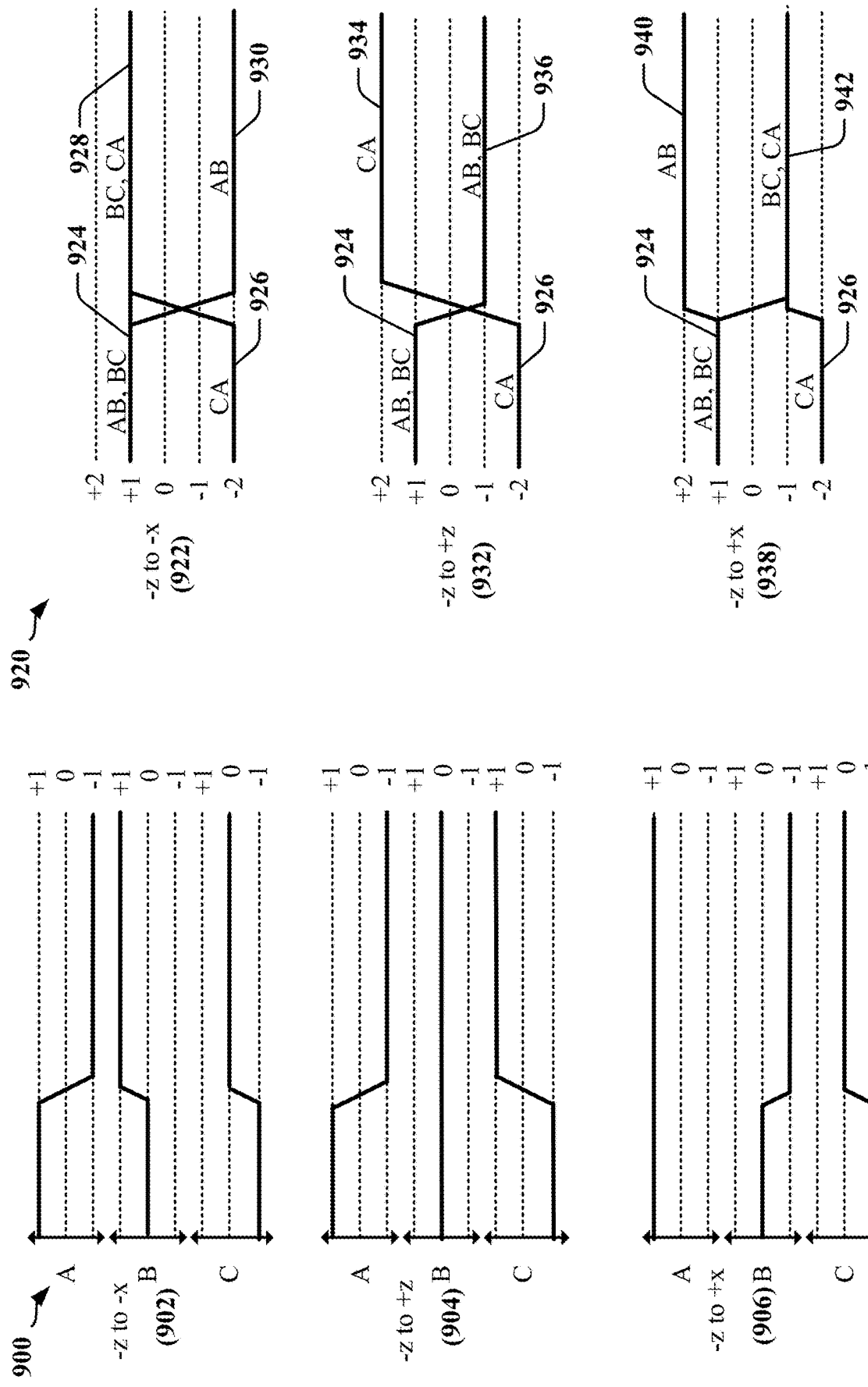
FIG. 9 illustrates one example of signal transitions occurring between pairs of consecutive symbols transmitted on a C-PHY interface.

FIG. 9 includes timing diagrams 900 and 920 representative of certain examples of transitions from a first signaling state to a second signaling state between certain consecutive symbols. The signaling state transitions illustrated in the timing diagrams 900 and 920 are selected for illustrative purposes, and other transitions and combinations of transitions can occur in a MIPI Alliance C-PHY interface. The timing diagrams 900 and 920 relate to an example of a 3-wire, 3-phase communication link, in which multiple receiver output transitions may occur at each symbol interval boundary due to differences in rise and fall time between the signal levels on the trio of wires. With reference also to FIG. 8, the first timing diagrams 900 illustrate the signaling states of the trio of signal wires 318a, 318b and 318c (A, B, and C) before and after a transition and second timing diagrams 920 illustrate the outputs of the differential receivers 802a, 802b and 802c, which provides difference signals 810a, 810b, 810c representative of the differences between signal wires 318a, 318b and 318c. In many instances, a set of differential receivers 802a, 802b and 802c may be configured to capture transitions by comparing different combinations for two signal wires 318a, 318b and 318c. In one example, these differential receivers 802a, 802b and 802c may be configured to produce outputs by determining the difference (e.g. by subtraction) of their respective input voltages.

In each of the examples shown in the timing diagrams 900 and 920, the initial a symbol representing the −z state 616 (see FIG. 8) transitions to a different symbol. As shown in the timing diagrams 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing diagrams 922, 932, 938 for the differential receiver outputs.

In a first example corresponding to the timing diagrams 902, 922, a transition occurs from a symbol representing the −z state 616 to a symbol representing the −x signaling state 612 (see FIG. 6) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from −2 difference 926 to a +1 difference 928.

In a second example corresponding to the timing diagrams 904, 932, a transition occurs from a symbol representing the −z signaling state 616 to a symbol representing the +z signaling state 606 in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing diagrams 906, 938, a transition occurs from a symbol representing the −z signaling state 616 to a symbol representing the +x signaling state 602 in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in measured differences, where the transitions can span 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

An M-wire N-Phase encoding system, such as a 3-wire, 3-phase encoder may encode a signal that has at least one transition at every symbol boundary and the receiver may recover a clock using those guaranteed transitions. In some implementations, the receiver requires data signals to be stable immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A-B, B-C, and C-A outputs of differential receivers 802a, 802b and 802c of FIG. 6).

Figure 10:
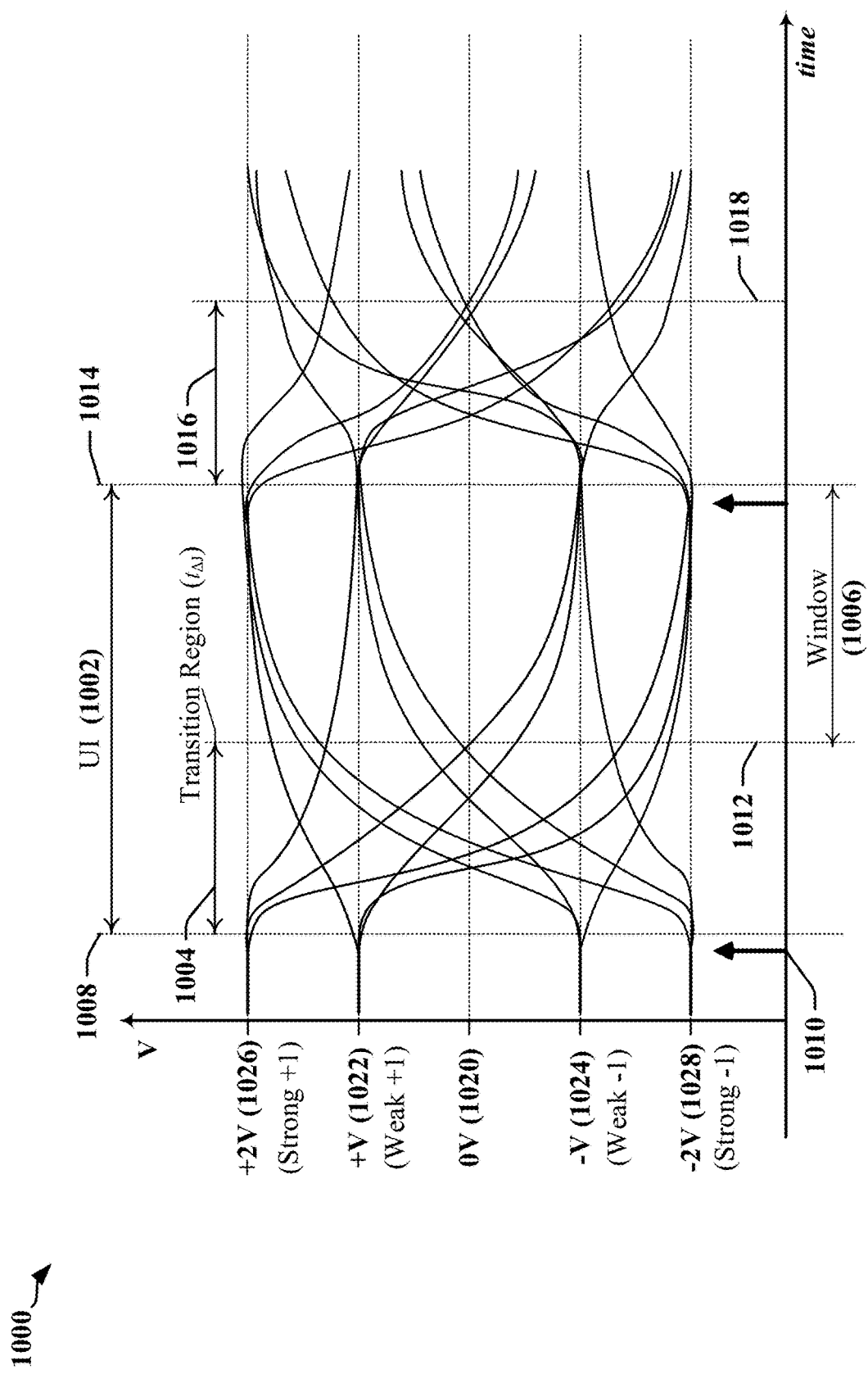
FIG. 10 illustrates transition regions and eye regions in an eye-pattern for a C-PHY interface.

FIG. 10 illustrates an example of a multi-level eye-pattern 1000 generated for the outputs of a set of three differential receivers that each compare two of three signals received over a C-PHY interface. The multi-level eye-pattern 1000 may be generated by overlaying the signals output by the differential receivers 802a, 802b, 802c in a C-PHY receiver circuit (see FIG. 8). The multi-level eye-pattern 1000 spans a symbol interval, which may be referred to as a unit interval (UI 1002). The UI 1002 may correspond to the period of a transmission clock used to control transmission of each symbol or the period of a receive clock recovered from signaling received from the C-PHY bus.

In one example, the multi-level eye-pattern 1000 may be generated using a fixed, symbol-independent trigger 1010. In the multi-level eye-pattern 1000, five nominal voltage levels 1020, 1022, 1024, 1026, 1028 define the potential states of the outputs of the differential receivers 802a, 802b, 802c in. The multi-level eye-pattern 1000 illustrates the possible transitions at the outputs of the differential receivers 802a, 802b, 802c used to 3-wire, 3-phase encoded signals. The three voltage levels defined for the 3-wire, 3-phase encoded signals can cause the differential receivers 802a, 802b, and 802c to generate outputs that vary between strong voltage levels 1026, 1028 and weak voltage levels 1022, 1024 for both positive and negative polarities. Typically, only one signal wire 318a, 318b and 318c is undriven in any symbol and the differential receivers 802a, 802b, and 802c do not produce a 0 state output corresponding to the 0-Volt voltage level 1020.

The voltage levels 1022, 1024, 1026, 1028 corresponding to weak and strong levels need not be evenly spaced with respect to the 0-Volt voltage level 1020. For example, the weak voltage levels 1022, 1024 represent a comparison of voltages that may include a mid-point voltage defined for the signal wires 318a, 318b and 318c, or a voltage level reached by an undriven signal wire 318a, 318b and 318c. The multi-level eye-pattern 1000 may use reference point in time (e.g. a trigger based on a transmission clock) to overlap the waveforms produced by the differential receivers 802a, 802b, and 802c. In the receivers, the three pairs of difference signals are generated simultaneously to enable data capture at the receiving device. The waveforms illustrated in FIG. 10 are representative of the difference signals 810a, 810b, 810c (A-B, B-C, and C-A) produced by the differential receivers 802a, 802b.

Drivers, receivers and other devices used in a C-PHY 3-Phase decoder may exhibit different switching characteristics that can exhibit as relative delays between signals received from the three wires. Multiple receiver output transitions may be observed at each symbol interval boundary 1008 and/or 1014 due to differences in the rise and fall time between the three signals of the trio of signal wires 318a, 318b, 318c and due to differences in signal propagation times between the combinations of pairs of signals received from the signal wires 318a, 318b, 318c. The multi-level eye-pattern 1000 may capture variances in rise and fall times as a relative delay in transitions near each symbol interval boundary 1008 and 1014. In some examples, the variances in rise and fall times may be due to the different characteristics of the 3-Phase drivers. Differences in rise and fall times may also result in an effective shortening or lengthening of the duration of the observed or effective symbol interval at the receiver for any given symbol.

A signal transition region 1004, 1016 represents a time, or period of uncertainty, where variable signal rise times prevent reliable decoding. The illustrated signal transition regions 1004, 1016 may commence at a symbol interval boundary 1008, 1014 and terminate at an endpoint 1012, 1018 corresponding to the last crossing of the 0-Volt voltage level 1020 by a difference signal 810a, 810b, 810c. Signaling state may be reliably determined in an "eye opening" or window 1006 representing the time period in which the symbol is stable and can be reliably received and decoded. In one example, a window 1006 may be considered to begin at the endpoint 1012 of the signal transition region 1004, and the window 1006 may be considered to close at the next symbol interval boundary 1014 of the symbol interval, and/or when the signaling state of the signal wires 318a, 318b, 318c and/or the outputs of the three differential receivers 802a, 802b and 802c have begun to change to reflect the next symbol.

The maximum transmission speed of a C-PHY interface may be limited by the duration of the signal transition region 1004, 1016 compared to the window 1006. A receiver may use a mask circuit that blocks transition detection after the first-detected transition during a signal transition regions 1004, 1016. After the first-detected transition, the mask circuit may ignore subsequent transitions for a duration that corresponds to the longest expected or measured signal transition region 1004, 1016. The duration of the window 1006 is affected by the duration of the mask.

Figure 11:
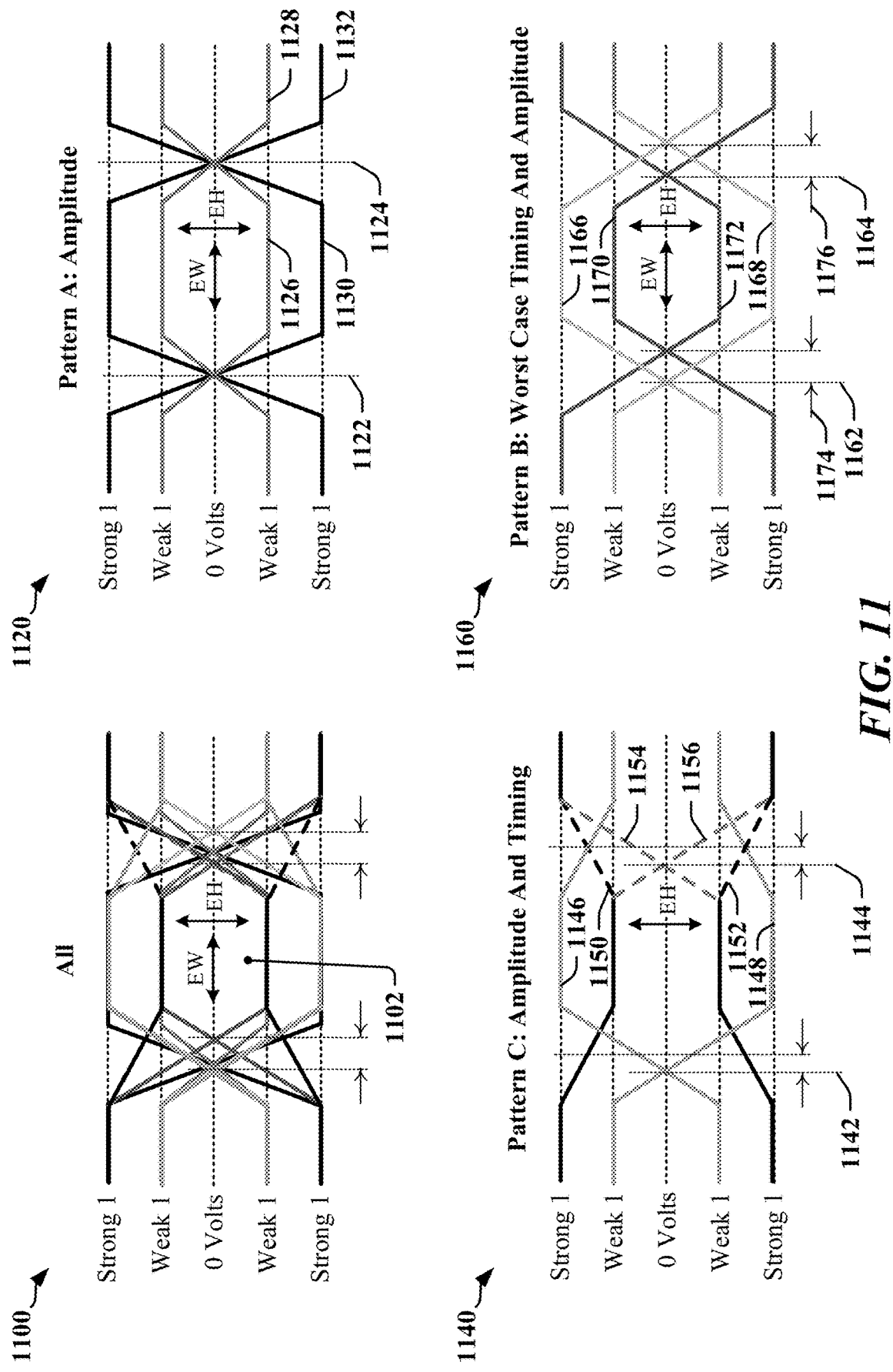
FIG. 11 illustrates eye-diagrams corresponding to the nominal or idealized signals output by the three differential receivers in a C-PHY 3-Phase interface.

FIG. 11 illustrates eye-diagrams 1100, 1120, 1140, 1160 corresponding to the nominal or idealized signals output by the three differential receivers in a C-PHY 3-Phase interface. In one aspect, FIG. 11 illustrates three patterns of differential output signals associated with possible sequences of symbols transmitted over the C-PHY interface. All three patterns are overlaid in a first eye-diagram 1100, thereby illustrating the effective window 1102 of the C-PHY interface for the illustrated signaling rate. The effective window 1102 may be characterized by a height (EH) and a width (EW). The height represents the differential signal amplitude range separating a logic 1 from a logic 0. The width represents the time during which the symbol can be reliably captured.

The second eye-diagram 1120 of FIG. 11 includes combinations of transitions that are least susceptible to timing jitter. Four signals 1126, 1128, 1130, 1132 change state at each symbol transition 1122, 1124. Two signals 1126, 1128 transition between weak high voltage and weak low voltage, and two signals 1130, 1132 transition between strong high voltage and strong low voltage. As a result, the zero crossings for all four signals 1126, 1128, 1130, 1132 occur in close proximity.

The third eye-diagram 1140 of FIG. 11 includes combinations of transitions that exhibit moderate timing jitter. Two signals 1146, 1148 have zero crossings at a first symbol transition 1142, and two other signals 1154, 1156 have zero crossings at a second symbol transition 1144. The zero crossings occur in signals that transition from weak low-voltage to strong high-voltage or weak high-voltage to strong low-voltage. At the first symbol transition 1142, four signals 1150, 1152, 1154, 1156 transition from the strong voltage state to the weak voltage state of the same polarity. At the second symbol transition 1144, two signals 1146, 1148 transition from the strong voltage state to the weak voltage state of the same polarity, and two signals 1150, 1152 transition from the weak voltage state to the strong voltage state of the same polarity.

The fourth eye-diagram 1160 of FIG. 11 includes combinations of transitions that provide worst case timing jitter 1174, 1176 as well as certain amplitude challenges. All four signals have zero crossings at both symbol transitions 1162, 1164. At the first symbol transition 1162, two signals 1166, 1168 transition from the weak voltage state of one polarity to the strong voltage state of the other polarity, while two signals 1170, 1172 transition from the strong voltage state of one polarity to the weak voltage state of the other polarity. At the second symbol transition 1164, two signals 1170, 1172 transition from the weak voltage state of one polarity to the strong voltage state of the other polarity, while two signals 1166, 1168 transition from the strong voltage state of one polarity to the weak voltage state of the other polarity. The differences in starting voltage at each symbol transition 1142, 1144 may result in different zero crossings. All four signaling states can occur at the outputs of the differential receivers at each symbol transition 1142, 1144.

The first-detected transition may be used to generate an edge in the receive clock signal that is used to capture signaling state of the difference signals 810a, 810b, 810c. The first-detected transition may vary between consecutive symbol intervals. Differences between the timing of the first-detected transition in consecutive symbols may result in timing skews between edges in the receive clock signal. Such variability between edges in the receive clock signal can cause an inconstant receiver UI or symbol interval for a stream of symbols received in a C-PHY receiver. The duration of receiver UI may be affected by the timing of first-detected transitions associated with consecutively received symbols. In one example, a longer receiver UI or symbol period may be observed when a symbol that has an early first-detected transition precedes a symbol that has a late first-detected transition. In another example, a shorter receiver UI or symbol period may be observed when a symbol that has a late first-detected transition precedes a symbol that has an early first-detected transition.

Figure 12:
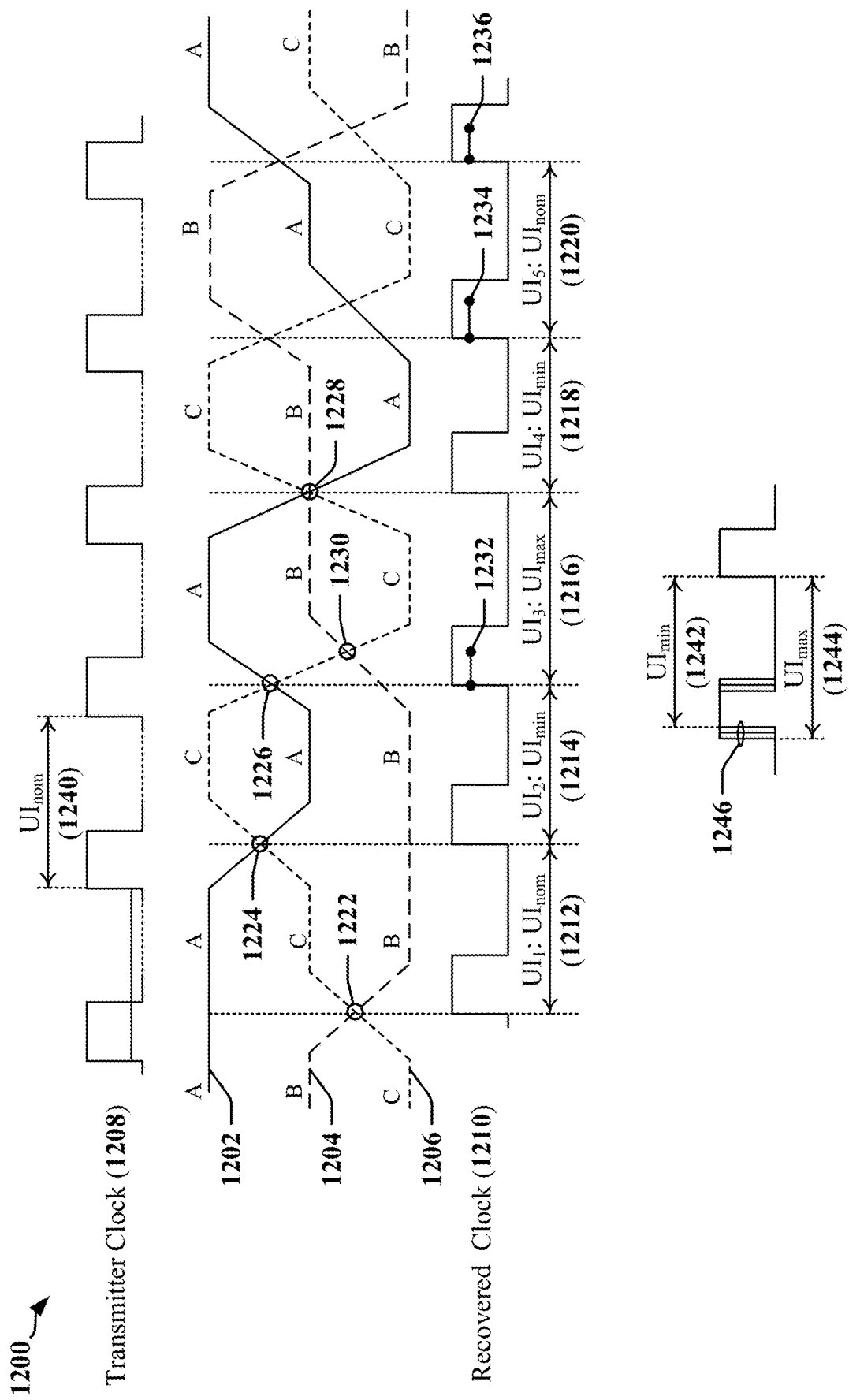
FIG. 12 illustrates certain aspects of the relationship between clock skew, UI duration and patterns of consecutively transmitted symbols in a C-PHY interface.

FIG. 12 includes a timing diagram 1200 that illustrates certain aspects of the relationship between clock skew, UI duration and patterns of consecutively transmitted symbols in a C-PHY interface. The timing diagram 1200 illustrates the 3-phase signals 1202, 1204, 1206 transmitted on the A, B and C wires of a C-PHY bus. Symbols are transmitted in accordance with a transmit clock 1208, which conventionally defines a constant transmitter UI duration 1240. Each bit in a symbol defines the signaling state of one of the 3-phase signals 1202, 1204, 1206. The receiver generates pulses in the recovered clock signal 1210 upon detection of a first transition in one of the difference signals 810a, 810b, 810c.

A first RxUI 1212 may be defined by the first-detected transition 1222 between a first symbol and a second symbol, and a first-detected transition 1224 between the second symbol and a third symbol. The first-detected transition 1222 between the first symbol and the second symbol is detected in the difference signal 810b that represents the difference that occurs when the relative polarity of the B and C wires switch. The first-detected transition 1224 between the second symbol and the third symbol is detected in the difference signal 810c that represents the difference that occurs when the relative polarity of the C and A wires switch. The timing of the switches in signaling states associated with these transitions 1222, 1224 is comparable or the same and the resultant duration of the first RxUI 1212 may correspond closely to the nominal value for RxUI, which may correspond to the UI duration 1240 defined by the transmit clock 1208.

A second RxUI 1214 may be defined by the first-detected transition 1224 between the second symbol and the third symbol, and a first-detected transition 1226 between the third symbol and a fourth symbol. Here, the first-detected transition 1224 between the second symbol and the third symbol is detected in the difference signal 810c that represents the difference that occurs when the signaling states of the C and A wires switch. The first-detected transition 1226 between the third symbol and the fourth symbol is detected in the difference signal 810c that represents the difference between the signaling states of the C and A wires switch, and this transition occurs relatively early. In this instance, the signaling state of the 3-phase signal 1206 transmitted on the C wire changes between maximum and minimum levels and may change more rapidly than the signaling state of the 3-phase signal 1202 transmitted on the A wire. Accordingly, the duration of the second RxUI 1214 may be shortened and may correspond to a minimum RxUI duration 1242, which may be less than the duration of the UI duration 1240 defined by the transmit clock 1208.

A third RxUI 1216 may be defined by the first-detected transition 1226 between the third symbol and the fourth symbol, and a first-detected transition 1228 between the fourth symbol and a fifth symbol. The first-detected transition 1226 between the third symbol and the fourth symbol is detected in the difference signal 810c that represents the difference between the C and A wires switch, which transition occurs relatively early. The first-detected transition 1228 between the fourth symbol and the fifth symbol is detected in the difference signal 810c that represents the difference between the signaling states of the C and A wires are switched. In this instance, the signaling state of the 3-phase signals 1202 and 1206 transmitted on the A and C wires changes between maximum and minimum levels and the transition may be delayed. Accordingly, the duration of the second RxUI 1216 may correspond to a maximum RxUI duration 1244, which may be greater than the duration of the UI duration 1240 defined by the transmit clock 1208. The magnitude of UI jitter 1246 in the recovered clock signal 1210 may correspond to the difference between minimum RxUI duration 1242 and maximum RxUI duration 1244.

Examples of fourth and fifth RxUIs 1218 and 1220 are also illustrated. Variability in the RxUIs 1212, 1214, 1216, 1218, 1220 (i.e., the duration of the received symbol) causes the period of the recovered clock in the receiver to vary. In many instances, the recovered clock can experience large variations in frequency (where period=1/frequency). Furthermore, the mask circuit used by the receiver to block transition detection after the first-detected transition can affect the maximum data rate that can be obtained from a C-PHY interface. The mask circuit may employ delay elements that are susceptible to variations in manufacturing process, circuit supply voltage, and die temperature (PVT) conditions. Delays may be increased to ensure that the mask circuit is effective in blocking transition detection after the first-detected transition. The mask circuit delays the opening of the window 1006 (see FIG. 10) used to capture symbols. The delay introduced by the mask circuit must be less than the minimum RxUI duration 1242 to ensure that the receive clock is reliably recovered.

In one example, a mask circuit may be configured to mask the second-detected transition 1230 associated with the beginning of the fourth symbol. In this example, the delay introduced by the mask circuit must be sufficient to include the signal transition region 1232 defined by the time elapsed between the first-detected transition 1226 and the second-detected transition 1230 as well as the signal transition regions 1234, 1236 for other symbols.

Figure 13:
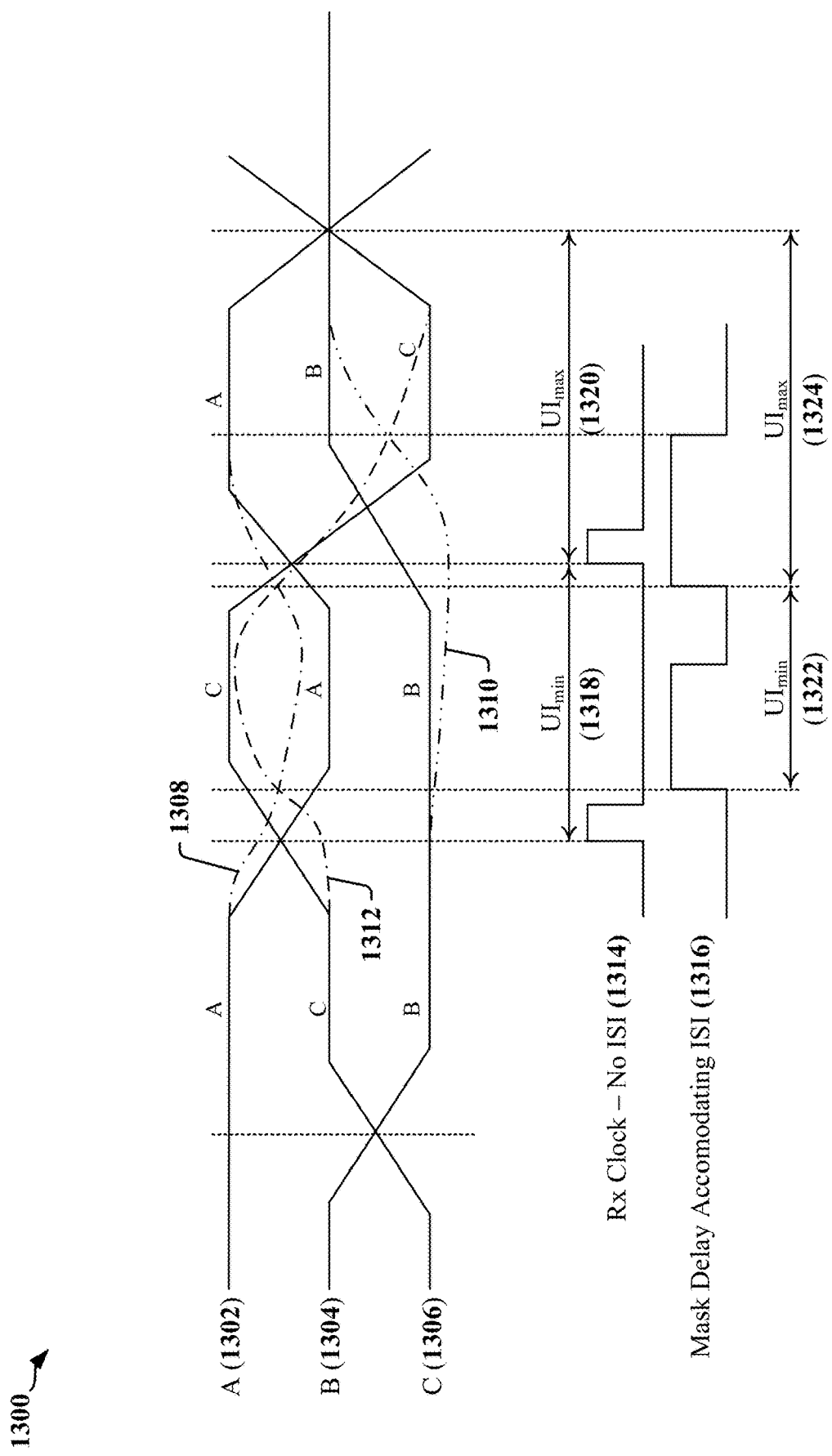
FIG. 13 illustrates the effect of inter-symbol interference on UI duration in a C-PHY interface.

FIG. 13 is a timing diagram 1300 that illustrates the effect of inter-symbol interference (ISI) on UI duration in a C-PHY interface. ISI may describe certain distortions of signals that can occur when a first-transmitted symbol interferes with one or more subsequently-transmitted symbols. In the illustrated example, distorted signals 1308, 1310 and 1312 are received from the wires 1302, 1304, 1306 of the C-PHY bus during certain symbols. The distortions can exacerbate differences in the timing of first-detected transition in one or more symbols, thereby increasing the difference between minimum RxUI duration 1318 and maximum RxUI duration 1320. The delay in the masking circuit may be increased to accommodate the difference between the minimum RxUI duration 1318 and maximum RxUI duration 1320 for a nominal received clock 1314 and the minimum RxUI duration 1322 and maximum RxUI duration 1324 when ISI affects the C-PHY bus. The mask delay 1316 that accommodates ISI is increased. The receiver may successfully receive and decode symbols provided the minimum RxUI duration 1322 exceeds the mask period.

UI jitter can be reduced to some extent by equalization. Equalization may improve the slope rate of the distorted signals 1308, 1310 and 1312. Typically, equalization cannot accommodate all differences in transition timing, without compromising other characteristics of the difference signals 810a, 810b, 810c.

Certain aspects of this disclosure provide systems, apparatus, methods and techniques that can improve unit interval jitter in a C-PHY interface. In one aspect, a C-PHY transmitting circuit is configured to selectively delay transmission of certain symbols. In another aspect, symbols are selected for delay based on patterns in the sequence of symbols presented for transmission. Each symbol in the sequence defines the signaling state of the trio of wires during a symbol transmission interval. In one example, a pattern detection circuit can identify pairs of symbols that are expected to produce a short transition duration between symbol transmission intervals. The C-PHY transmitting circuit may be configured to delay transmission of the second-transmitted symbol in the pair of symbols, thereby extending the window of time during which a receiver can capture the first-transmitted symbol in the pair of symbols. In other examples, the C-PHY transmitting circuit may be configured to advance transmission of a symbol when a long transition duration is expected. In another aspect, delay or advancement of an entire symbol preserves common mode benefits provided by the C-PHY interface by maintaining the relationship between transitions of the three wires of the C-PHY interconnect. A disturbance in common mode operation can be expected when transitions on one of the wires in a trio is advanced or delayed to improve consistency of symbol transition times. The common mode disturbance may occur when the sum of currents and/or voltages on the trio is not zero and/or constant over the transition period.

Figure 14:
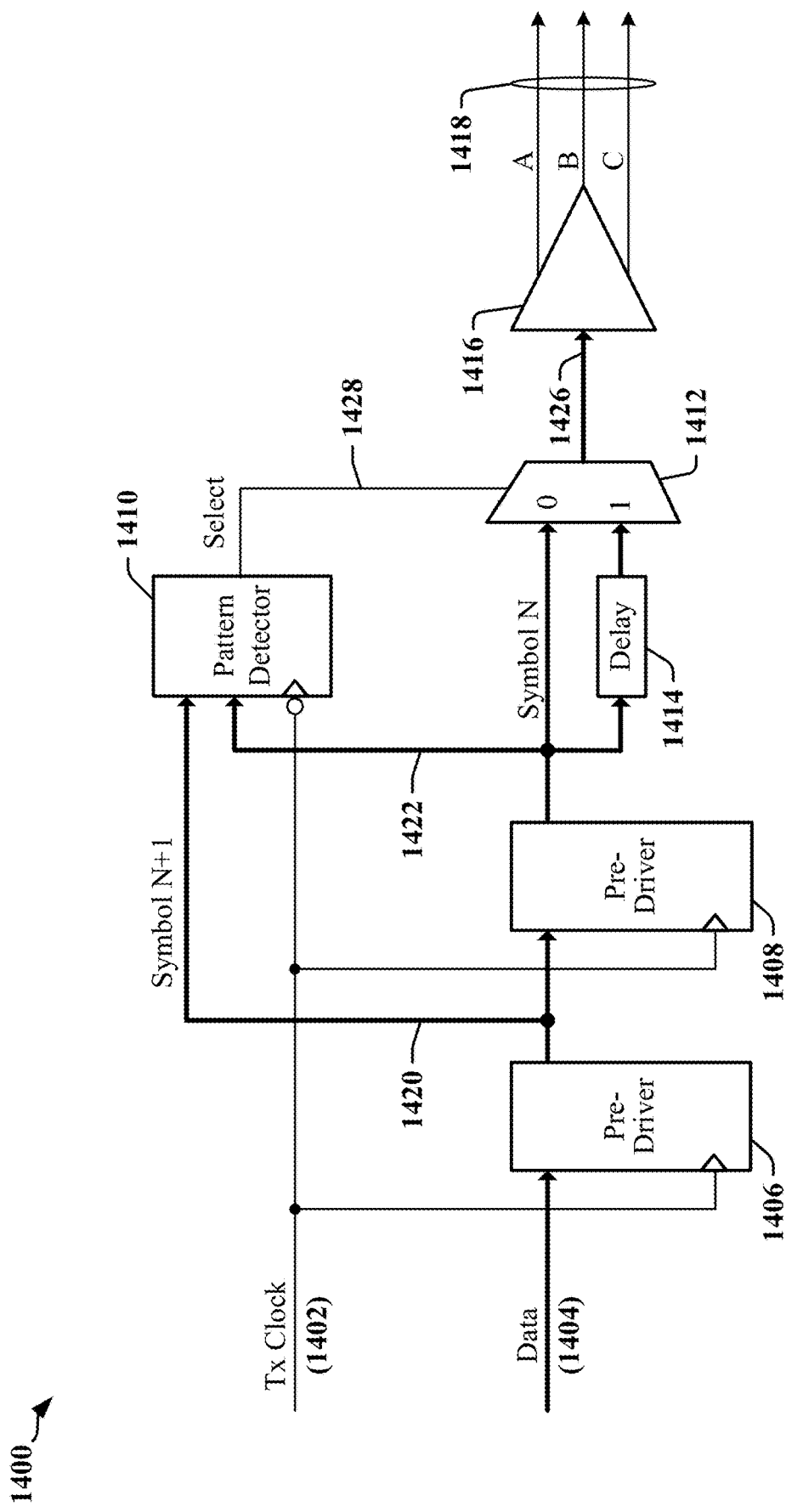
FIG. 14 illustrates a transmitting circuit provided in accordance with certain aspects of this disclosure.

FIG. 14 illustrates an example of a transmitting circuit 1400 provided in accordance with certain aspects of this disclosure. The transmitting circuit 1400 uses pattern detection to adjust timing of 3-phase signals 1418 transmitted over a C-PHY bus. The transmitting circuit 1400 may be configured to narrow the difference between minimum and maximum UI durations, thereby minimizing UI jitter.

The transmitting circuit 1400 may be operated in accordance with timing provided by a transmitter clock signal 1402. The transmitter clock signal 1402 may be used to clock symbol data 1404 through a pair of pre-driver circuits 1406, 1408. In one example, each pre-driver circuit 1406, 1408 includes a register or other device to hold a symbol as it passes through the transmitting circuit 1400. An output of a first pre-driver circuit 1408 provides the currently-transmitted symbol (Symbol$_N$ 1422), while the output of a second pre-driver circuit 1406 provides the next symbol to be transmitted (Symbol$_{N+1}$ 1420). The currently-transmitted symbol and the next symbol to be transmitted are provided to a pattern detector 1410 that determines whether the next symbol to be transmitted is to be delayed before initiating transmission.

The pattern detector 1410 may be operated in accordance with timing provided by the transmitter clock signal 1402. In the illustrated example, the pattern detector 1410 provides a select signal 1428 that selects between the inputs of a multiplexer 1412 to provide an input 1426 to a 3-wire line driver circuit 1416. The select signal 1428 selects between a delayed version and an undelayed version of a current symbol 1422, which is one of a sequence of symbols provided in the symbol data 1404. The undelayed version of the current symbol 1422 is provided by the pre-driver circuit 1408 to a first input of the multiplexer 1412 and the delayed version of the current symbol 1422 is provided by a delay circuit 1414 to a second input of the multiplexer 1412. The multiplexer 1412 drives the input 1426 to the 3-wire line driver circuit 1416.

In certain examples, the pattern detector 1410 is configured to determine when a pair of symbols to be sequentially transmitted is represented by a two-symbol pattern that matches a pattern expected to produce a short transition duration between symbol transmission intervals. The undelayed version of the current symbol may be selected by the pattern detector 1410 when a combination of the current symbol with an immediately preceding symbol indicates no pattern match. The delayed version of the current symbol may be selected by the pattern detector 1410 when the combination of the current symbol with the immediately preceding symbol indicates a pattern match.

In some examples, transitions in the select signal 1428 are synchronized by the transmitter clock signal 1402 that is provided to the pattern detector 1410 and which also controls timing of the pre-driver circuits 1406, 1408. In one example, the select signal 1428 is synchronized to a falling edge in the transmitter clock signal 1402 while the pre-driver circuits 1406, 1408 are clocked by rising edges in the transmitter clock signal 1402. That is, each pattern detect decision is captured at the falling edge of the transmitter clock signal 1402, while the output of each of the pre-driver circuits 1406, 1408 captures its corresponding input state at each rising edge in the transmitter clock signal 1402. In this example, the inputs to the pattern detector 1410 have a half-cycle of the transmitter clock signal 1402 to stabilize and the pattern detect decisions have a half-cycle of the transmitter clock signal 1402 to stabilize.

In one example, the pattern detector 1410 may delay initiating transmission of the next symbol to be transmitted if all bits of the next symbol to be transmitted are different from the bits of the currently-transmitted symbol. That is, a delay is applied to the next symbol to be transmitted if:

$$[A_{N+1} \neq A_N] \& [B_{N+1} \neq B_N] \& [C_{N+1} \neq C_N].$$

The delay may be applied by providing the output of the pre-driver circuit 1408 to one input of the multiplexer 1412 and to the delay circuit 1414. The output of the delay circuit 1414 is provided to a second input of the multiplexer 1412.

The delay circuit 1414 may include one or more programmable delay elements. The programmable delay elements can be used to configure the delay applied to the next symbol to be transmitted. The delay circuit 1414 may be configured during manufacture, system integration and/or during power-on initialization of the transmitting circuit 1400. In some implementations, the delay circuit 1414 may be dynamically configured. In one example, the delay circuit 1414 may be configured during a calibration procedure. In another example, the delay circuit 1414 may be configured to accommodate changes in PVT conditions. In another example, the delay circuit 1414 may be configured in response to a request or command received from a higher layer protocol or application.

The maximum data rate for the C-PHY bus may be increased and the reliability of a decoder at the receiver can be improved when UI jitter is decreased. UI Jitter is exhibited at the receiver as a variable-duration UI that includes a maximum UI and a minimum UI (see FIG. 12). The maximum UI is caused when a transition between a first-transmitted pair of symbols (e.g., $S_N$ and $S_{N+1}$) propagates to the difference signals 810*a*, 810*b*, 810*c* at the receiver with minimum detection delay, while a transition between a second-transmitted pair of symbols (e.g., $S_{N+1}$ and $S_{N+2}$) propagates to the difference signals 810*a*, 810*b*, 810*c* at the receiver with maximum detection delay. The minimum UI is caused when, for example, a transition between a first-transmitted pair of symbols (e.g., $S_M$ and $S_{M+1}$) propagates to the difference signals 810*a*, 810*b*, 810*c* at the receiver with maximum detection delay, while a second transition between second-transmitted pair of symbols (e.g., $S_{M+1}$ and $S_{M+2}$) propagates to the difference signals 810*a*, 810*b*, 810*c* at the receiver with minimum detection delay.

The delay circuit 1414 may be configured to minimize UI Jitter at the receiver. In one example, the delay circuit 1414 can be used to decrease the difference between the duration of the maximum UI and the duration of the minimum UI by delaying launch of a current symbol that is expected to produce a transition that will propagate to the difference signals 810*a*, 810*b*, 810*c* at the receiver with minimum detection delay. In one example, an optimal delay introduced by the delay circuit 1414 may approximate the difference between the minimum detection delay and the maximum detection delay associated with the differential receivers 802*a*, 802*b* and 802*c*. Introducing a delay in the launch of the current symbol effectively produces an increased minimum detection delay at the receiver.

A clock recovery circuit at the receiver can be configured to provide a smaller mask delay when UI jitter is reduced. Mask delay is configured to accommodate the difference between the minimum detection delay and the maximum detection delay. In some implementations, the pattern detector 1410 selectively causes the delay circuit 1414 to delay the launch of a current symbol that is expected to produce a minimum transition time and/or minimum detection delay at the receiver and/or based on detection of a sequence of symbols that is expected to cause the minimum UI duration at the receiver.

Examples of Processing Circuits and Methods

Figure 15:
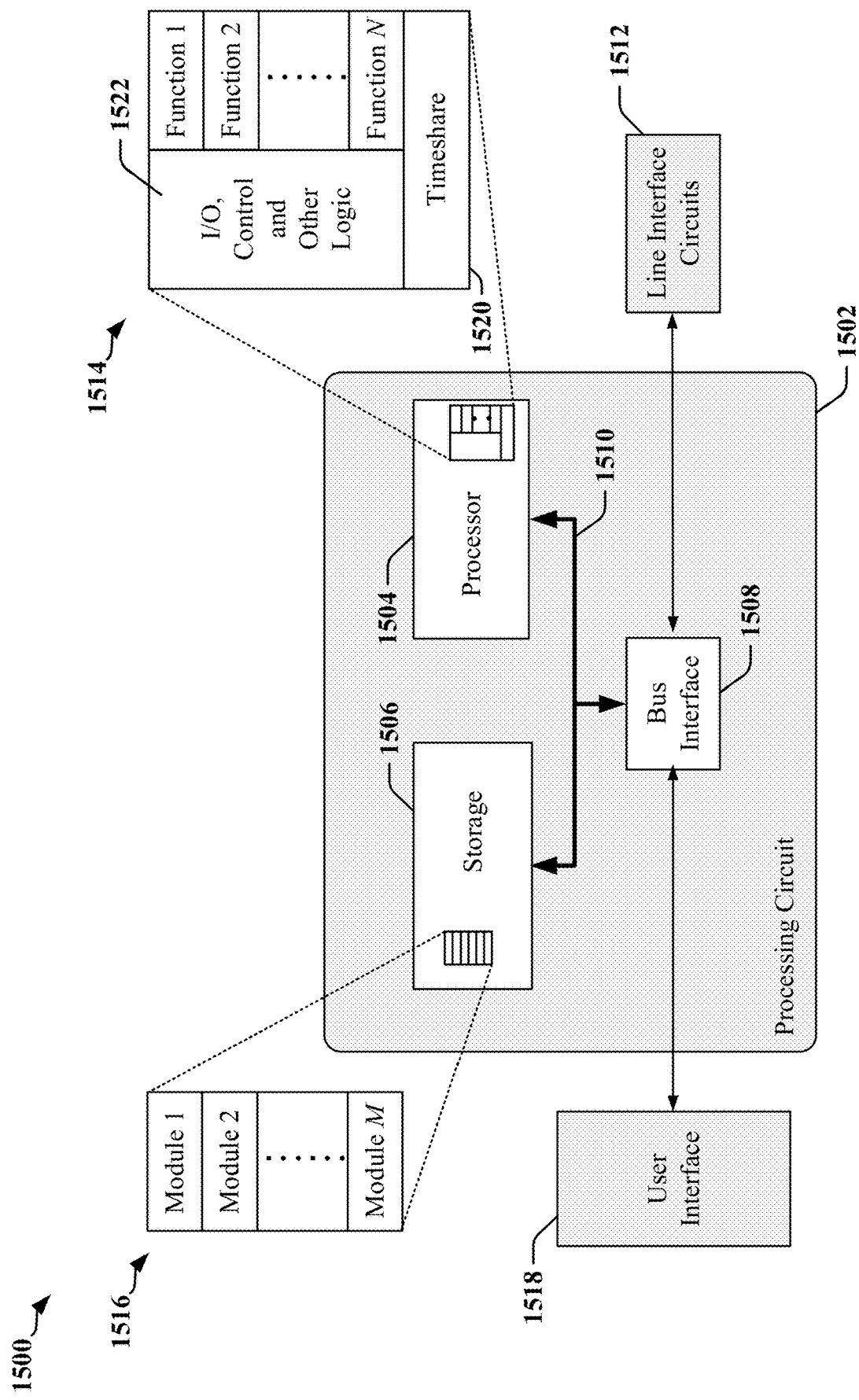
FIG. 15 is a block diagram illustrating an example of an apparatus employing a processing circuit that may be adapted according to certain aspects disclosed herein.

FIG. 15 illustrates an example of a hardware implementation for an apparatus 1500 employing a processing circuit 1502 that may be configured to perform one or more functions disclosed herein. In accordance with various aspects of the disclosure, an element, or any portion of an element, or any combination of elements as disclosed herein may be implemented using the processing circuit 1502. The processing circuit 1502 may include certain devices, circuits, and/or logic that support clock recovery techniques disclosed herein.

The processing circuit 1502 may include one or more processors 1504 that are controlled by some combination of hardware and software modules. Examples of processors 1504 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. In one example, the bus 1510 links together various circuits including the one or more processors 1504 and a processor-readable storage medium 1506. The processor-readable storage medium 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512. A transceiver 1512 may be provided for each networking technology supported by the processing circuit. In some instances, multiple networking technologies may share some or all of the circuitry or processing modules found in a transceiver 1512. Each transceiver 1512 provides a means for communicating with various other apparatus over a transmission medium. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium, which may include the processor-readable storage medium 1506. In this respect, the processing circuit 1502, including the processor 1504, may be used to implement any of the methods, functions and techniques disclosed herein.

The processor-readable storage medium 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 1506 or in another external processor-readable medium. The processor-readable storage medium 1506 may include a non-transitory computer-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The processor-readable storage medium 1506 may also include, by way of example, a carrier wave, a transmission line, and any other suitable medium for transmitting software and/or instructions that may be accessed and read by a computer. The processor-readable storage medium 1506 may reside in the processing circuit 1502, in the processor 1504, external to the processing circuit 1502, or be distributed across multiple entities including the processing circuit 1502. The processor-readable storage medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The processor-readable storage medium 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
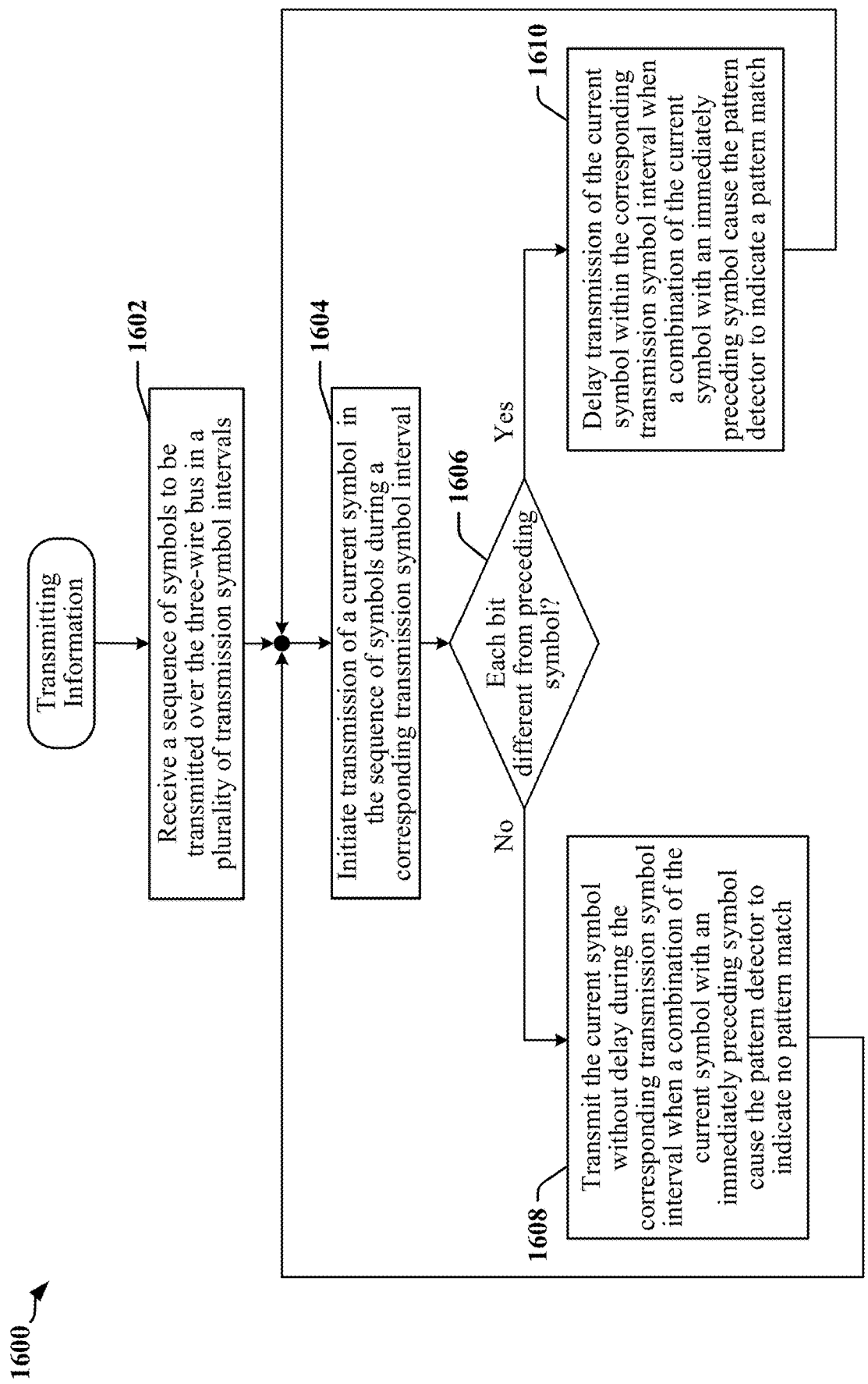
FIG. 16 is a flowchart of a first method of calibration according to certain aspects disclosed herein.

FIG. 16 is a flowchart 1600 of a method for transmitting information over a three-wire bus. In one example, the three-wire bus may be operated in accordance with a C-PHY protocol. At block 1602, the transmitting device may receive a sequence of symbols to be transmitted over the three-wire bus in a plurality of transmission symbol intervals. The transmission symbol intervals may correspond to periods of a transmission clock. The transmitter may receive a current symbol from the sequence of symbols for transmission during a corresponding transmission symbol interval At block 1604, the transmitting device may initiate transmission of the current symbol in the sequence of symbols during a corresponding transmission symbol interval. The transmitting device may provide each symbol, in sequence, to a pipeline that includes multiple pre-driver circuits 1406, 1408 (see FIG. 14), thereby obtaining copies of at least two symbols, including a first symbol that is being transmitted and a second symbol that will be transmitted next. At a transition between symbol intervals, the second symbol becomes the current symbol, and the first symbol becomes the immediately preceding symbol. When initiating transmission of the current symbol in the sequence of symbols during a corresponding transmission symbol interval at block 1604, the transmitting device may determine at block 1606 whether transmission of the current symbol will cause an early detection at the receiving device of the transition between the first and second symbol. The transmitting device may make such determination through the use of a pattern detector. When each bit of the current symbol is different from the corresponding bit in the immediately preceding symbol, the method may continue at block 1610. Otherwise, the method continues at block 1608.

At block 1608, the transmitting device may transmit the current symbol without delay during the corresponding transmission symbol interval when a combination of the current symbol with an immediately preceding symbol cause the pattern detector to indicate no pattern match.

At block 1610, the transmitting device may delay transmission of the current symbol within the corresponding transmission symbol interval when the combination of the current symbol with the immediately preceding symbol cause the pattern detector to indicate a pattern match.

In one example, the transmitting device may delay transmission of the current symbol within the corresponding transmission symbol interval when signaling state of each wire of the three-wire bus defined by the current symbol is different from signaling state of a corresponding wire defined by the immediately preceding symbol.

In certain implementations, a duration of a received symbol interval in which the current symbol is received at a receiver is expected to be less than a duration of a transmission symbol interval in which the current symbol is transmitted when the immediately preceding symbol is followed in transmission by an undelayed version of the current symbol. Delaying transmission of the current symbol within the corresponding transmission symbol interval may increase the duration of the received symbol interval. Delaying transmission of the current symbol within the corresponding transmission symbol interval can decrease jitter in a clock signal recovered at the receiver.

In some implementations, delaying transmission of the current symbol within the corresponding transmission symbol interval includes delaying three signals representative of the current symbol by a delay duration calculated to reduce a difference between a duration of a received symbol interval at a receiver and a duration of a transmission symbol interval corresponding to the current symbol. The delay duration may be further configured to reduce a signal transition region in the receiver. The transmitting device may modify the delay duration to accommodate changes in variations in manufacturing process, circuit supply voltage, and die temperature conditions. The transmitting device may transmit the sequence of symbols is over the three-wire bus in accordance with a C-PHY protocol.

Figure 17:
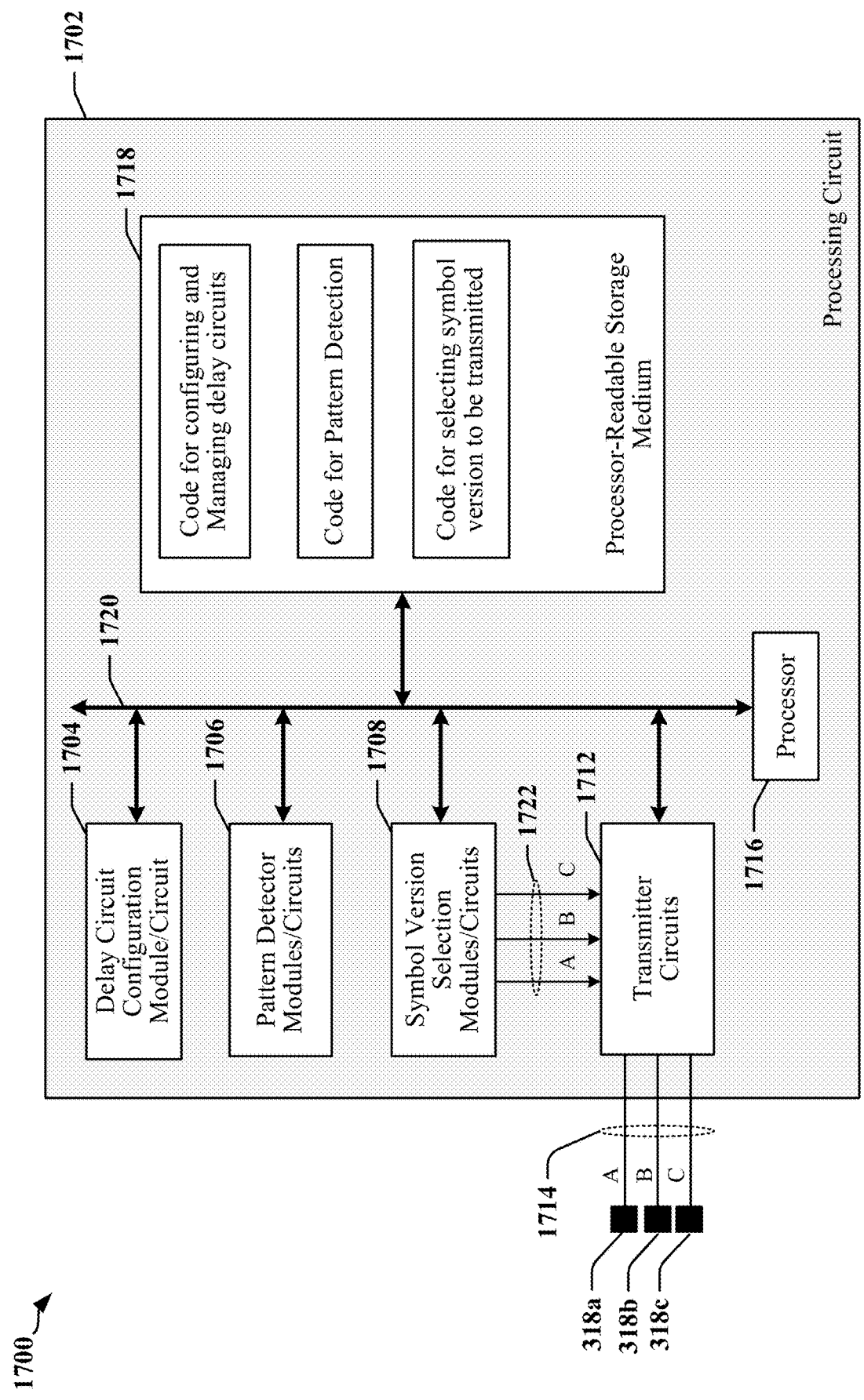
FIG. 17 is a diagram illustrating a first example of a hardware implementation for an apparatus employing a processing employing a processing circuit adapted according to certain aspects disclosed herein.

FIG. 17 is a diagram illustrating an example of a hardware implementation for an apparatus 1700 employing a processing circuit 1702. The processing circuit 1702 typically has at least one processor 1716 that may include one or more of a microprocessor, microcontroller, digital signal processor, a sequencer and a state machine. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706 and 1708, transmitter circuits 1712 that generate difference signals 1722 representative of differences in signaling state between different pairs of the connectors or wires 1714 and the processor-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the processor-readable storage medium 1718. The software, when executed by the processor 1716, causes the processing circuit 1702 to perform the various functions described supra for any particular apparatus. The processor-readable storage medium 1718 may also be used for storing data that is manipulated by the processor 1716 when executing software, including data decoded from symbols transmitted over the connectors or wires 1714, which may be configured as a C-PHY bus. The processing circuit 1702 further includes at least one of the modules 1704, 1706 and 1708. The modules 1704, 1706 and 1708 may be software modules running in the processor 1716, resident/stored in the processor-readable storage medium 1718, one or more hardware modules coupled to the processor 1716, or some combination thereof. The modules 1704, 1706 and/or 1708 may include microcontroller instructions, state machine configuration parameters, or some combination thereof.

In one configuration, the apparatus 1700 may be configured for data communication in accordance with a C-PHY interface protocol. The apparatus 1700 may include modules and/or circuits 1708 configured to select symbols for transmission in each symbol transmission interval where, for example, the transmitting device may select between a delayed and undelayed version of the current symbol. The selected symbol may be provided to the transmitter circuits 1712 in a three-bit signal, a 21-bit (7-symbol) word, or the like. The apparatus 1700 may include modules and/or circuits 1706 that are configured to detect certain patterns of signaling created at the transition between the current symbol and immediately-preceding symbol. The apparatus 1700 may include modules and/or circuits 1704 for configuring and operating delay circuits used to provide the delayed version of the current symbol.

In one example, the apparatus 1700 has a driver circuit configured to drive a three-wire bus in accordance with a symbol received at an input of the driver circuit, a pattern detector configured to receive a sequence of symbols to be transmitted over the three-wire bus in a plurality of transmission symbol intervals, and a selection circuit responsive to a select signal provided by the pattern detector and configured to select between delayed and undelayed versions of a current symbol taken from the sequence of symbols to drive the input of the driver circuit during a corresponding transmission symbol interval. The select signal may select the delayed version of the current symbol when the pattern detector determines that a transition between the undelayed version of the current symbol and an immediately preceding symbol in the sequence of symbols is expected to cause an early detection of the transition at a receiver.

In one example, early detection of the transition at the receiver is expected to occur when signaling state of each wire of the three-wire bus defined by the current symbol is different from signaling state of a corresponding wire defined by the immediately preceding symbol.

In certain implementations, a duration of a received symbol interval in which the current symbol is received at a receiver is expected to be less than a duration of a transmission symbol interval in which the current symbol is transmitted when the immediately preceding symbol is followed in transmission by the undelayed version of the current symbol. The duration of the received symbol interval may increase when the delayed version of the current symbol is selected to drive the input of the driver circuit during the corresponding transmission symbol interval. Jitter in a clock signal recovered at the receiver can be reduced when the delayed version of the current symbol is selected to drive the input of the driver circuit during the corresponding transmission symbol interval.

The apparatus 1700 may include a delay circuit configured to generate delayed versions of three signals representative of the current symbol by delaying the three signals by a delay duration calculated to reduce a difference between a duration of a received symbol interval at a receiver and a duration of a transmission symbol interval corresponding to the current symbol. The delay duration may be further configured to reduce a signal transition region in the receiver. The apparatus 1700 may have a controller configured to modify the delay duration to accommodate changes in variations in manufacturing process, circuit supply voltage, and die temperature conditions.

The sequence of symbols may be transmitted over the three-wire bus in accordance with a C-PHY protocol.

The processor-readable storage medium 1718 may be a non-transitory storage medium and may store instructions and/or code that, when executed a processor 1716, cause the processing circuit 1702 to receive a sequence of symbols to be transmitted over a three-wire bus in a plurality of transmission symbol intervals and, when initiating transmission of a current symbol in the sequence of symbols during a corresponding transmission symbol interval, transmit the current symbol without delay during the corresponding transmission symbol interval when a combination of the current symbol with an immediately preceding symbol cause the pattern detector to indicate no pattern match, and/or delay transmission of the current symbol within the corresponding transmission symbol interval when the combination of the current symbol with the immediately preceding symbol cause the pattern detector to indicate a pattern match.

In one example, the instructions and/or code may further cause the processing circuit 1702 to delay transmission of the current symbol within the corresponding transmission symbol interval when signaling state of each wire of the three-wire bus defined by the current symbol is different from signaling state of a corresponding wire defined by the immediately preceding symbol. A duration of a received symbol interval in which the current symbol is received at a receiver may be less than a duration of a transmission symbol interval in which the current symbol is transmitted when the immediately preceding symbol is followed in transmission by an undelayed version of the current symbol. Delaying transmission of the current symbol within the corresponding transmission symbol interval may increase the duration of the received symbol interval.

In one example, the instructions and/or code may further cause the processing circuit 1702 to delay three signals representative of the current symbol by a delay duration calculated to reduce a difference between a duration of a received symbol interval at a receiver and a duration of a transmission symbol interval corresponding to the current symbol. The delay duration may be further configured to reduce a signal transition region in the receiver.

The instructions and/or code may further cause the processing circuit 1702 to transmit the sequence of symbols is over the three-wire bus in accordance with a C-PHY protocol.

Some implementation examples are described in the following numbered clauses:

1. A transmitter comprising: a driver circuit configured to drive a three-wire bus in accordance with a symbol received at an input of the driver circuit; a pattern detector configured to receive a sequence of symbols to be transmitted over the three-wire bus in a plurality of transmission symbol intervals; and a selection circuit responsive to a select signal provided by the pattern detector and configured to select between a delayed version and an undelayed version of a current symbol taken from the sequence of symbols to drive the input of the driver circuit during a corresponding transmission symbol interval, wherein the select signal selects the undelayed version of the current symbol when a combination of the current symbol with an immediately preceding symbol cause the pattern detector to indicate no pattern match, and wherein the select signal selects the delayed version of the current symbol when the combination of the current symbol with the immediately preceding symbol cause the pattern detector to indicate a pattern match.

2. The transmitter as described in clause 1, wherein early detection of a transition at a receiver is expected to occur when signaling state of each wire of the three-wire bus defined by the current symbol is different from signaling state of a corresponding wire defined by the immediately preceding symbol.

3. The transmitter as described in clause 1 or clause 2, wherein a duration of a received symbol interval in which the current symbol is received at a receiver is expected to be less than a duration of a transmission symbol interval in which the current symbol is transmitted when the immediately preceding symbol is followed in transmission by the undelayed version of the current symbol.

4. The transmitter as described in clause 3, wherein the duration of the received symbol interval increases when the delayed version of the current symbol is selected to drive the input of the driver circuit during the corresponding transmission symbol interval.

5. The transmitter as described in clause 3 or clause 4, wherein jitter in a clock signal recovered at the receiver is reduced when the delayed version of the current symbol is selected to drive the input of the driver circuit during the corresponding transmission symbol interval.

6. The transmitter as described in any of clauses 1-5, further comprising: a delay circuit configured to generate delayed versions of three signals representative of the current symbol by delaying the three signals by a delay duration calculated to reduce a difference between a duration of a received symbol interval at a receiver and a duration of a transmission symbol interval corresponding to the current symbol.

7. The transmitter as described in clause 6, wherein the delay duration is further configured to reduce a signal transition region in the receiver.

8. The transmitter as described in clause 6 or clause 7, further comprising: a controller configured to modify the delay duration to accommodate changes in variations in manufacturing process, circuit supply voltage, and die temperature conditions.

9. The transmitter as described in any of clauses 1-8, wherein the sequence of symbols is transmitted over the three-wire bus in accordance with a C-PHY protocol.

10. A method for transmitting information over a three-wire bus, comprising: receiving a sequence of symbols to be transmitted over the three-wire bus in a plurality of transmission symbol intervals; and when initiating transmission of a current symbol in the sequence of symbols during a corresponding transmission symbol interval: transmitting the current symbol without delay during the corresponding transmission symbol interval when a combination of the current symbol with an immediately preceding symbol cause a pattern detector to indicate no pattern match; and delaying transmission of the current symbol within the corresponding transmission symbol interval when the combination of the current symbol with the immediately preceding symbol cause the pattern detector to indicate a pattern match.

11. The method as described in clause 10, further comprising: delaying transmission of the current symbol within the corresponding transmission symbol interval when signaling state of each wire of the three-wire bus defined by the current symbol is different from signaling state of a corresponding wire defined by the immediately preceding symbol.

12. The method as described in clause 10 or clause 11, wherein a duration of a received symbol interval in which the current symbol is received at a receiver is expected to be less than a duration of a transmission symbol interval in which the current symbol is transmitted when the immediately preceding symbol is followed in transmission by an undelayed version of the current symbol.

13. The method as described in clause 12, wherein delaying transmission of the current symbol within the corresponding transmission symbol interval increases the duration of the received symbol interval.

14. The method as described in clause 12 or clause 13, wherein delaying transmission of the current symbol within the corresponding transmission symbol interval decreases jitter in a clock signal recovered at the receiver.

15. The method as described in any of clauses 10-14, wherein delaying transmission of the current symbol within the corresponding transmission symbol interval comprises: delaying three signals representative of the current symbol by a delay duration calculated to reduce a difference between a duration of a received symbol interval at a receiver and a duration of a transmission symbol interval corresponding to the current symbol.

16. The method as described in clause 15, wherein the delay duration is further configured to reduce a signal transition region in the receiver.

17. The method as described in clause 15 or clause 16, further comprising: modifying the delay duration to accommodate changes in variations in manufacturing process, circuit supply voltage, and die temperature conditions.

18. The method as described in any of clauses 10-17, further comprising: transmitting the sequence of symbols is over the three-wire bus in accordance with a C-PHY protocol.

19. A processor-readable storage medium having one or more instructions which, when executed by at least one processor of a processing circuit in a receiver, cause the at least one processor to: receive a sequence of symbols to be transmitted over a three-wire bus in a plurality of transmission symbol intervals; and when initiating transmission of a current symbol in the sequence of symbols during a corresponding transmission symbol interval: transmit the current symbol without delay during the corresponding transmission symbol interval when a combination of the current symbol with an immediately preceding symbol cause a pattern detector to indicate no pattern match; and delay transmission of the current symbol within the corresponding transmission symbol interval when the combination of the current symbol with the immediately preceding symbol cause the pattern detector to indicate a pattern match.

20. The storage medium as described in clause 19, further comprising instructions that cause the at least one processor to: delay transmission of the current symbol within the corresponding transmission symbol interval when signaling state of each wire of the three-wire bus defined by the current symbol is different from signaling state of a corresponding wire defined by the immediately preceding symbol.

21. The storage medium as described in clause 19 or clause 20, wherein a duration of a received symbol interval in which the current symbol is received at a receiver is expected to be less than a duration of a transmission symbol interval in which the current symbol is transmitted when the immediately preceding symbol is followed in transmission by an undelayed version of the current symbol.

22. The storage medium as described in clause 21, wherein delaying transmission of the current symbol within the corresponding transmission symbol interval increases the duration of the received symbol interval.

23. The storage medium as described in clause 21 or clause 22, wherein delaying transmission of the current symbol within the corresponding transmission symbol interval comprises: delaying three signals representative of the current symbol by a delay duration calculated to reduce a difference between a duration of a received symbol interval at a receiver and a duration of a transmission symbol interval corresponding to the current symbol, wherein the delay duration is further configured to reduce a signal transition region in the receiver.

24. The storage medium as described in any of clauses 19-23, further comprising: transmitting the sequence of symbols is over the three-wire bus in accordance with a C-PHY protocol.

25. A transmitting apparatus comprising: means for receiving a sequence of symbols to be transmitted over a three-wire bus in a plurality of transmission symbol intervals; and means for transmitting symbols over the three-wire bus, the means for transmitting symbols being configured to transmit a current symbol in the sequence of symbols during a corresponding transmission symbol by: transmitting the current symbol without delay during a corresponding transmission symbol interval when a combination of the current symbol with an immediately preceding symbol cause a pattern detector to indicate no pattern match; and delaying transmission of the current symbol within the corresponding transmission symbol interval when the combination of the current symbol with the immediately preceding symbol cause the pattern detector to indicate a pattern match.

26. The transmitting apparatus as described in clause 25, wherein the means for transmitting symbols is further configured to: delay transmission of the current symbol within the corresponding transmission symbol interval when signaling state of each wire of the three-wire bus defined by the current symbol is different from signaling state of a corresponding wire defined by the immediately preceding symbol.

27. The transmitting apparatus as described in clause 25 or clause 26, wherein a duration of a received symbol interval in which the current symbol is received at a receiver is expected to be less than a duration of a transmission symbol interval in which the current symbol is transmitted when the immediately preceding symbol is followed in transmission by an undelayed version of the current symbol.

28. The transmitting apparatus as described in clause 27, wherein delaying transmission of the current symbol within the corresponding transmission symbol interval increases the duration of the received symbol interval.

29. The transmitting apparatus as described in any of clauses 25-28, wherein the means for transmitting symbols is further configured to: delay three signals representative of the current symbol by a delay duration calculated to reduce a difference between a duration of a received symbol interval at a receiver and a duration of a transmission symbol interval corresponding to the current symbol, wherein the delay duration is further configured to reduce a signal transition region in the receiver.

30. The transmitting apparatus as described in any of clauses 25-29, further comprising: transmitting the sequence of symbols is over the three-wire bus in accordance with a C-PHY protocol.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A transmitter comprising:
   a driver circuit configured to drive a three-wire bus in accordance with a symbol received at an input of the driver circuit;
   a pattern detector configured to receive a sequence of symbols to be transmitted over the three-wire bus in a plurality of transmission symbol intervals, and further configured to compare each pair of consecutively transmitted symbols in the sequence of symbols, wherein each symbol in the sequence of symbols comprises three binary bits configured to cause a change in signaling state of at least one wire of the three-wire bus at the beginning of a transmission symbol interval associated with the each symbol; and
   a selection circuit responsive to a select signal provided by the pattern detector and configured to select between a delayed version and an undelayed version of a current symbol taken from the sequence of symbols to drive the input of the driver circuit during a corresponding transmission symbol interval,
   wherein the select signal selects the undelayed version of the current symbol when a combination of the current symbol with an immediately preceding symbol causes the pattern detector to indicate no pattern match, and
   wherein the select signal selects the delayed version of the current symbol when the combination of the current symbol with the immediately preceding symbol causes the pattern detector to indicate a pattern match.

2. The transmitter of claim 1, wherein early detection of a transition at a receiver is expected to occur when signaling state of each wire of the three-wire bus defined by the current symbol is different from signaling state of a corresponding wire defined by the immediately preceding symbol.

3. The transmitter of claim 1, wherein a duration of a received symbol interval in which the current symbol is received at a receiver is expected to be less than a duration of a transmission symbol interval in which the current symbol is transmitted when the immediately preceding symbol is followed in transmission by the undelayed version of the current symbol.

4. The transmitter of claim 3, wherein the duration of the received symbol interval increases when the delayed version of the current symbol is selected to drive the input of the driver circuit during the corresponding transmission symbol interval.

5. The transmitter of claim 3, wherein jitter in a clock signal recovered at the receiver is reduced when the delayed version of the current symbol is selected to drive the input of the driver circuit during the corresponding transmission symbol interval.

6. The transmitter of claim 1, further comprising:
   a delay circuit configured to generate delayed versions of three signals representative of the current symbol by delaying the three signals by a delay duration calculated to reduce a difference between a duration of a received symbol interval at a receiver and a duration of a transmission symbol interval corresponding to the current symbol.

7. The transmitter of claim 6, wherein the delay duration is further configured to reduce a signal transition region in the receiver.

8. The transmitter of claim 6, further comprising:
   a controller configured to modify the delay duration to accommodate changes in variations in manufacturing process, circuit supply voltage, and die temperature conditions.

9. The transmitter of claim 1, wherein the sequence of symbols is transmitted over the three-wire bus in accordance with a C-PHY protocol.

10. A method for transmitting information over a three-wire bus, comprising:
    receiving a sequence of symbols to be transmitted over the three-wire bus in a plurality of transmission symbol intervals, wherein each symbol in the sequence of symbols comprises three binary bits configured to cause a change in signaling state of at least one wire of the three-wire bus at the beginning of a transmission symbol interval associated with the each symbol;
    using a pattern detector to compare each pair of consecutively transmitted symbols in the sequence of symbols; and
    when initiating transmission of a current symbol in the sequence of symbols during a corresponding transmission symbol interval:
    transmitting the current symbol without delay during the corresponding transmission symbol interval when a combination of the current symbol with an immediately preceding symbol causes the pattern detector to indicate no pattern match; and delaying transmission of the current symbol within the corresponding transmission symbol interval when the combination of the current symbol with the immediately preceding symbol causes the pattern detector to indicate a pattern match.

11. The method of claim 10, further comprising:
delaying transmission of the current symbol within the corresponding transmission symbol interval when signaling state of each wire of the three-wire bus defined by the current symbol is different from signaling state of a corresponding wire defined by the immediately preceding symbol.

12. The method of claim 10, wherein a duration of a received symbol interval in which the current symbol is received at a receiver is expected to be less than a duration of a transmission symbol interval in which the current symbol is transmitted when the immediately preceding symbol is followed in transmission by an undelayed version of the current symbol.

13. The method of claim 12, wherein delaying transmission of the current symbol within the corresponding transmission symbol interval increases the duration of the received symbol interval.

14. The method of claim 12, wherein delaying transmission of the current symbol within the corresponding transmission symbol interval decreases jitter in a clock signal recovered at the receiver.

15. The method of claim 10, wherein delaying transmission of the current symbol within the corresponding transmission symbol interval comprises:
delaying three signals representative of the current symbol by a delay duration calculated to reduce a difference between a duration of a received symbol interval at a receiver and a duration of a transmission symbol interval corresponding to the current symbol.

16. The method of claim 15, wherein the delay duration is further configured to reduce a signal transition region in the receiver.

17. The method of claim 15, further comprising:
modifying the delay duration to accommodate changes in variations in manufacturing process, circuit supply voltage, and die temperature conditions.

18. The method of claim 10, further comprising:
transmitting the sequence of symbols is over the three-wire bus in accordance with a C-PHY protocol.

19. A non-transitory processor-readable storage medium having one or more instructions which, when executed by at least one processor of a processing circuit in a receiver, cause the at least one processor to:
receive a sequence of symbols to be transmitted over a three-wire bus in a plurality of transmission symbol intervals, wherein each symbol in the sequence of symbols comprises three binary bits configured to cause a change in signaling state of at least one wire of the three-wire bus at the beginning of a transmission symbol interval associated with the each symbol;
compare each pair of consecutively transmitted symbols in the sequence of symbols using a pattern detector; and
when initiating transmission of a current symbol in the sequence of symbols during a corresponding transmission symbol interval:
transmit the current symbol without delay during the corresponding transmission symbol interval when a combination of the current symbol with an immediately preceding symbol causes the pattern detector to indicate no pattern match; and
delay transmission of the current symbol within the corresponding transmission symbol interval when the combination of the current symbol with the immediately preceding symbol causes the pattern detector to indicate a pattern match.

20. The storage medium of claim 19, further comprising instructions that cause the at least one processor to:
delay transmission of the current symbol within the corresponding transmission symbol interval when signaling state of each wire of the three-wire bus defined by the current symbol is different from signaling state of a corresponding wire defined by the immediately preceding symbol.

21. The storage medium of claim 19, wherein a duration of a received symbol interval in which the current symbol is received at a receiver is expected to be less than a duration of a transmission symbol interval in which the current symbol is transmitted when the immediately preceding symbol is followed in transmission by an undelayed version of the current symbol.

22. The storage medium of claim 21, wherein delaying transmission of the current symbol within the corresponding transmission symbol interval increases the duration of the received symbol interval.

23. The storage medium of claim 19, wherein delaying transmission of the current symbol within the corresponding transmission symbol interval comprises:
delaying three signals representative of the current symbol by a delay duration calculated to reduce a difference between a duration of a received symbol interval at a receiver and a duration of a transmission symbol interval corresponding to the current symbol, wherein the delay duration is further configured to reduce a signal transition region in the receiver.

24. The storage medium of claim 19, further comprising:
transmitting the sequence of symbols is over the three-wire bus in accordance with a C-PHY protocol.

25. A transmitting apparatus comprising:
means for receiving a sequence of symbols to be transmitted over a three-wire bus in a plurality of transmission symbol intervals, comprising a pattern detector configured to compare each pair of consecutively transmitted symbols in the sequence of symbols, wherein each symbol in the sequence of symbols comprises three binary bits configured to cause a change in signaling state of at least one wire of the three-wire bus at the beginning of a transmission symbol interval associated with the each symbol; and
means for transmitting symbols over the three-wire bus, the means for transmitting symbols being configured to transmit a current symbol in the sequence of symbols during a corresponding transmission symbol by:
transmitting the current symbol without delay during a corresponding transmission symbol interval when a combination of the current symbol with an immediately preceding symbol causes the pattern detector to indicate no pattern match; and
delaying transmission of the current symbol within the corresponding transmission symbol interval when the combination of the current symbol with the immediately preceding symbol causes the pattern detector to indicate a pattern match.

26. The transmitting apparatus of claim 25, wherein the means for transmitting symbols is further configured to:

delay transmission of the current symbol within the corresponding transmission symbol interval when signaling state of each wire of the three-wire bus defined by the current symbol is different from signaling state of a corresponding wire defined by the immediately preceding symbol.

27. The transmitting apparatus of claim 25, wherein a duration of a received symbol interval in which the current symbol is received at a receiver is expected to be less than a duration of a transmission symbol interval in which the current symbol is transmitted when the immediately preceding symbol is followed in transmission by an undelayed version of the current symbol.

28. The transmitting apparatus of claim 27, wherein delaying transmission of the current symbol within the corresponding transmission symbol interval increases the duration of the received symbol interval.

29. The transmitting apparatus of claim 25, wherein the means for transmitting symbols is further configured to:
   delay three signals representative of the current symbol by a delay duration calculated to reduce a difference between a duration of a received symbol interval at a receiver and a duration of a transmission symbol interval corresponding to the current symbol, wherein the delay duration is further configured to reduce a signal transition region in the receiver.

30. The transmitting apparatus of claim 25, further comprising:
   transmitting the sequence of symbols is over the three-wire bus in accordance with a C-PHY protocol.

* * * * *